US010726431B2

United States Patent
Weiss et al.

(10) Patent No.: US 10,726,431 B2
(45) Date of Patent: Jul. 28, 2020

(54) CONSUMER ANALYTICS SYSTEM THAT DETERMINES, OFFERS, AND MONITORS USE OF REWARDS INCENTIVIZING CONSUMERS TO PERFORM TASKS

(71) Applicant: Service Management Group, LLC, Kansas City, MO (US)

(72) Inventors: Eric H. Weiss, Acton, MA (US); Andrew Volpe, Boston, MA (US); Robert Luedeman, San Francisco, CA (US); Andrew Fromm, Mission Hills, KS (US); Dennis Ehrich, Jr., Mission Hills, KS (US)

(73) Assignee: Service Management Group, LLC, Kansas City, MO (US)

( * ) Notice: Subject to any disclaimer, the term of this patent is extended or adjusted under 35 U.S.C. 154(b) by 0 days.

(21) Appl. No.: 14/043,717

(22) Filed: Oct. 1, 2013

(65) Prior Publication Data

US 2014/0095258 A1 Apr. 3, 2014

Related U.S. Application Data

(60) Provisional application No. 61/708,305, filed on Oct. 1, 2012.

(51) Int. Cl.
*G06Q 10/00* (2012.01)
*G06Q 30/02* (2012.01)

(52) U.S. Cl.
CPC ..... *G06Q 30/0203* (2013.01); *G06Q 30/0207* (2013.01); *G06Q 30/0211* (2013.01); *G06Q 30/0225* (2013.01)

(58) Field of Classification Search
CPC .......... G06Q 30/0203; G06Q 30/0205; G06Q 30/0211; G06Q 30/0207
(Continued)

(56) References Cited

U.S. PATENT DOCUMENTS 5,557,524 A 9/1996 Maki
5,740,035 A 4/1998 Cohen et al.
(Continued)

FOREIGN PATENT DOCUMENTS

EP 1361764 A1 11/2003
JP 2003-076911 A 3/2003
(Continued)

OTHER PUBLICATIONS

Usable mobile ambient intelligent solutions for hospitality customers G Collins—Journal of Information Technology Impact, 2010.*
(Continued)

*Primary Examiner* — Jonathan G Sterrett
(74) *Attorney, Agent, or Firm* — Wolf, Greenfield & Sacks, P.C.

(57) ABSTRACT

A method and system are provided for providing incentives and rewards to consumers in return for their sharing of their electronically-derived consumer location data and sharing their opinions and feedback. The system may be programmed to determine parameters of a reward offered to an individual consumer or group of consumers based on or more criteria. In addition, location-derived insights and information reported by the consumers may be used to segment and customize the available incentives and rewards for each consumer. Reward redemption analytics may also be used to evaluate the effectiveness of reward customization.

15 Claims, 8 Drawing Sheets

(58) Field of Classification Search
USPC .................................................. 705/7.11–7.42
See application file for complete search history.

(56) References Cited

U.S. PATENT DOCUMENTS

| | | | |
|---|---|---|---|
| 6,098,048 A | 8/2000 | Dashefsky et al. | |
| 6,161,059 A * | 12/2000 | Tedesco | G06Q 20/387 235/381 |
| 6,509,830 B1 | 1/2003 | Elliott | |
| 6,609,064 B1 | 8/2003 | Dean | |
| 6,647,269 B2 * | 11/2003 | Hendrey | G06Q 10/00 455/3.03 |
| 6,766,301 B1 * | 7/2004 | Daniel | G06Q 30/02 235/379 |
| 6,823,188 B1 * | 11/2004 | Stern | G08G 1/0962 455/41.2 |
| 6,912,507 B1 | 6/2005 | Phillips et al. | |
| 6,970,131 B2 | 11/2005 | Percy et al. | |
| 6,975,941 B1 | 12/2005 | Lau et al. | |
| 6,999,987 B1 | 2/2006 | Billingsley et al. | |
| 7,010,501 B1 | 3/2006 | Roslak et al. | |
| 7,176,834 B2 | 2/2007 | Percy et al. | |
| 7,215,280 B1 | 5/2007 | Percy et al. | |
| 7,240,834 B2 | 7/2007 | Kato et al. | |
| 7,305,245 B2 | 12/2007 | Alizadeh-Shabdiz et al. | |
| 7,408,502 B2 | 8/2008 | Percy et al. | |
| 7,515,578 B2 | 4/2009 | Alizadeh-Shabdiz et al. | |
| 7,586,439 B2 | 9/2009 | Percy et al. | |
| 7,589,628 B1 * | 9/2009 | Brady, Jr. | G01C 21/20 340/10.1 |
| 7,769,633 B2 | 8/2010 | Jokinen et al. | |
| 7,801,971 B1 * | 9/2010 | Amidon | G06Q 10/10 709/200 |
| 7,818,399 B1 | 10/2010 | Ross et al. | |
| 7,895,177 B2 * | 2/2011 | Wu | G06Q 30/02 707/706 |
| 7,930,204 B1 * | 4/2011 | Sharma | G06Q 30/0203 705/7.32 |
| 8,073,460 B1 * | 12/2011 | Scofield | G06Q 30/02 455/414.1 |
| 8,099,085 B2 * | 1/2012 | Lowry | G06Q 30/06 340/539.13 |
| 8,150,967 B2 | 4/2012 | King et al. | |
| 8,200,247 B1 * | 6/2012 | Starenky | G01C 21/28 455/404.2 |
| 8,271,322 B2 | 9/2012 | Ariyibi | |
| 8,335,709 B2 * | 12/2012 | Todd | G06Q 20/20 348/150 |
| 8,489,452 B1 * | 7/2013 | Warner | G06Q 30/0226 705/14.34 |
| 8,712,824 B1 | 4/2014 | Julian et al. | |
| 9,195,988 B2 * | 11/2015 | Fischer | G06Q 30/0204 |
| 9,560,478 B2 * | 1/2017 | Murad | H04N 21/214 |
| 2002/0052774 A1 * | 5/2002 | Parker | G06Q 30/02 705/7.32 |
| 2002/0082921 A1 | 6/2002 | Rankin | |
| 2002/0111154 A1 | 8/2002 | Eldering et al. | |
| 2002/0111172 A1 | 8/2002 | DeWolf et al. | |
| 2002/0119793 A1 | 8/2002 | Hronek et al. | |
| 2002/0167408 A1 | 11/2002 | Trajkovic et al. | |
| 2003/0033195 A1 | 2/2003 | Bruce et al. | |
| 2003/0146871 A1 | 8/2003 | Karr et al. | |
| 2003/0195800 A1 | 10/2003 | Peters | |
| 2004/0034570 A1 | 2/2004 | Davis | |
| 2004/0093265 A1 | 5/2004 | Ramchandani et al. | |
| 2004/0093268 A1 * | 5/2004 | Ramchandani | G06Q 30/02 705/14.13 |
| 2004/0133474 A1 * | 7/2004 | Tami | G06Q 20/20 705/16 |
| 2005/0055275 A1 * | 3/2005 | Newman | G06Q 30/02 705/14.41 |
| 2005/0059412 A1 | 3/2005 | Hosokawa | |
| 2005/0154639 A1 * | 7/2005 | Zetmeir | G06Q 30/02 705/14.23 |
| 2005/0171955 A1 * | 8/2005 | Hull | G06Q 50/01 |
| 2005/0177449 A1 | 8/2005 | Temares et al. | |
| 2005/0222829 A1 | 10/2005 | Dumas | |
| 2005/0243784 A1 | 11/2005 | Fitzgerald et al. | |
| 2005/0285741 A1 * | 12/2005 | Chipchase | H04M 1/7253 340/572.1 |
| 2006/0053058 A1 * | 3/2006 | Hotchkiss | G06Q 30/02 705/14.13 |
| 2006/0111961 A1 | 5/2006 | McQuivey | |
| 2006/0111962 A1 * | 5/2006 | Holsinger | G06Q 30/02 705/7.32 |
| 2006/0174329 A1 | 8/2006 | Dublish | |
| 2007/0010266 A1 | 1/2007 | Chaudhuri | |
| 2007/0127693 A1 * | 6/2007 | D'Ambrosio | G06Q 10/10 379/265.06 |
| 2007/0141540 A1 * | 6/2007 | Borg | G06Q 30/02 434/127 |
| 2007/0185768 A1 * | 8/2007 | Vengroff | G06Q 30/02 705/14.64 |
| 2007/0186007 A1 | 8/2007 | Field et al. | |
| 2008/0042836 A1 | 2/2008 | Christopher | |
| 2008/0070588 A1 | 3/2008 | Morin | |
| 2008/0125959 A1 | 5/2008 | Doherty et al. | |
| 2008/0158053 A1 | 7/2008 | Watanabe | |
| 2008/0246657 A1 | 10/2008 | Percy et al. | |
| 2008/0248815 A1 | 10/2008 | Busch | |
| 2008/0288331 A1 | 11/2008 | Magids et al. | |
| 2008/0319829 A1 | 12/2008 | Hunt et al. | |
| 2009/0055245 A1 * | 2/2009 | Bostock | G06Q 30/0203 705/7.32 |
| 2009/0064014 A1 * | 3/2009 | Nelson | H04N 7/163 715/764 |
| 2009/0064173 A1 | 3/2009 | Goldspink et al. | |
| 2009/0076888 A1 | 3/2009 | Oster et al. | |
| 2009/0083128 A1 | 3/2009 | Siegel | |
| 2009/0106085 A1 | 4/2009 | Raimbeault | |
| 2009/0112683 A1 * | 4/2009 | Hamilton, II | G06Q 30/02 705/7.32 |
| 2009/0125396 A1 * | 5/2009 | Otto | G06Q 10/087 705/14.26 |
| 2009/0132469 A1 | 5/2009 | White et al. | |
| 2009/0160703 A1 * | 6/2009 | Duffett-Smith | G01S 19/50 342/357.43 |
| 2009/0171939 A1 | 7/2009 | Athsani et al. | |
| 2009/0199107 A1 | 8/2009 | Lewis et al. | |
| 2009/0248288 A1 | 10/2009 | Bell et al. | |
| 2009/0254412 A1 * | 10/2009 | Braswell | G06Q 10/00 705/7.29 |
| 2009/0276235 A1 | 11/2009 | Benezra et al. | |
| 2009/0298480 A1 * | 12/2009 | Khambete | G06F 17/30699 455/414.1 |
| 2009/0298514 A1 | 12/2009 | Ullah | |
| 2009/0327025 A1 | 12/2009 | Kirch et al. | |
| 2010/0004997 A1 | 1/2010 | Mehta et al. | |
| 2010/0023401 A1 | 1/2010 | Ariyibi | |
| 2010/0076820 A1 | 3/2010 | Davis | |
| 2010/0106582 A1 | 4/2010 | Etheredge et al. | |
| 2010/0131443 A1 | 5/2010 | Agarwal et al. | |
| 2010/0191746 A1 | 7/2010 | Wang et al. | |
| 2010/0241573 A1 * | 9/2010 | Joa | G06Q 20/10 705/80 |
| 2010/0262449 A1 | 10/2010 | Monteforte et al. | |
| 2010/0262462 A1 * | 10/2010 | Tryfon | G06Q 30/0203 705/7.32 |
| 2010/0332315 A1 | 12/2010 | Kamar et al. | |
| 2011/0022424 A1 | 1/2011 | VonDerheide | |
| 2011/0029370 A1 | 2/2011 | Roeding et al. | |
| 2011/0076663 A1 * | 3/2011 | Krallman | G09B 7/00 434/362 |
| 2011/0093349 A1 * | 4/2011 | Drescher | G06Q 30/00 705/14.73 |
| 2011/0099041 A1 | 4/2011 | Weiss et al. | |
| 2011/0099046 A1 | 4/2011 | Weiss et al. | |
| 2011/0099047 A1 | 4/2011 | Weiss et al. | |
| 2011/0099048 A1 | 4/2011 | Weiss et al. | |
| 2011/0106721 A1 * | 5/2011 | Nickerson | G06Q 30/02 705/347 |
| 2011/0191140 A1 | 8/2011 | Newman et al. | |

(56) References Cited

U.S. PATENT DOCUMENTS

| | | | |
|---|---|---|---|
| 2011/0208599 A1* | 8/2011 | Sen | G06Q 20/20 705/16 |
| 2011/0231483 A1* | 9/2011 | Derraugh | G06F 17/30241 709/203 |
| 2011/0251864 A1* | 10/2011 | Warner | G06Q 10/063 705/7.11 |
| 2011/0270618 A1* | 11/2011 | Banerjee | G06Q 40/02 705/1.1 |
| 2011/0288906 A1* | 11/2011 | Thomas | G06Q 30/02 705/7.29 |
| 2011/0313874 A1* | 12/2011 | Hardie | H04W 4/02 705/26.1 |
| 2012/0005023 A1 | 1/2012 | Graff | |
| 2012/0054016 A1 | 3/2012 | Todd et al. | |
| 2012/0066026 A1 | 3/2012 | Dusig et al. | |
| 2012/0072263 A1 | 3/2012 | Dusig et al. | |
| 2012/0072288 A1* | 3/2012 | Dusig | G06Q 30/02 705/14.58 |
| 2012/0143720 A1* | 6/2012 | Moser | G01C 21/362 705/26.8 |
| 2012/0173305 A1* | 7/2012 | Bhaskaran | G06Q 30/02 705/7.32 |
| 2012/0226522 A1 | 9/2012 | Weiss et al. | |
| 2012/0226523 A1 | 9/2012 | Weiss et al. | |
| 2012/0232953 A1 | 9/2012 | Custer | |
| 2012/0233011 A1* | 9/2012 | Barlow | G06Q 30/08 705/26.3 |
| 2012/0239479 A1 | 9/2012 | Amaro et al. | |
| 2012/0246004 A1* | 9/2012 | Book | G06Q 30/02 705/14.58 |
| 2012/0253918 A1* | 10/2012 | Marois | G06Q 30/02 705/14.39 |
| 2012/0258735 A1* | 10/2012 | Monteverde | H04W 4/021 455/456.3 |
| 2012/0259693 A1* | 10/2012 | Dao | G06Q 30/0224 705/14.27 |
| 2012/0316938 A1* | 12/2012 | Moshfeghi | G06Q 30/02 705/14.16 |
| 2012/0316939 A1* | 12/2012 | Moshfeghi | G06Q 30/02 705/14.16 |
| 2012/0323662 A1* | 12/2012 | Otto | G06N 5/025 705/14.25 |
| 2012/0330716 A1* | 12/2012 | Volpe | G06Q 30/0201 705/7.29 |
| 2012/0330721 A1 | 12/2012 | Volpe et al. | |
| 2012/0330722 A1* | 12/2012 | Volpe | G06Q 30/0201 705/7.32 |
| 2013/0007049 A1* | 1/2013 | Ziemann | G06T 11/20 707/769 |
| 2013/0018701 A1 | 1/2013 | Dusig | |
| 2013/0035989 A1* | 2/2013 | Brown | G06Q 30/0201 705/7.33 |
| 2013/0096985 A1 | 4/2013 | Robinson et al. | |
| 2013/0145288 A1* | 6/2013 | Zadeh | G06F 3/0484 715/753 |
| 2013/0203506 A1* | 8/2013 | Brown | G06Q 30/0203 463/42 |
| 2013/0218637 A1* | 8/2013 | Bikman | G06Q 30/0201 705/7.32 |
| 2014/0108068 A1* | 4/2014 | Williams | G06Q 10/02 705/5 |
| 2014/0278668 A1* | 9/2014 | Paradise | G06Q 10/1095 705/7.19 |
| 2015/0025799 A1* | 1/2015 | Jackson | G01C 21/00 701/519 |

FOREIGN PATENT DOCUMENTS

| | | | | |
|---|---|---|---|---|
| JP | 2003-196456 A | 7/2003 | | |
| JP | 2005-275786 A | 10/2005 | | |
| KR | 20020016120 A | 3/2002 | | |
| KR | 2004-0068743 A | 8/2004 | | |
| KR | 10-2011-0069943 A | 6/2011 | | |
| KR | 2012-0087759 A | 8/2012 | | |
| KR | 20140108068 A * | 9/2014 | | |
| WO | WO 0244829 A2 | 6/2002 | | |
| WO | WO 2007070676 A2 * | 6/2007 | | G06Q 10/10 |
| WO | WO 2008-107880 A2 | 9/2008 | | |

OTHER PUBLICATIONS

International Search Report and Written Opinion for PCT/US2013/062934, dated Jan. 28, 2014.

Non-Final Office Action from U.S. Appl. No. 12/910,311 dated May 24, 2013.

International Search Report and Written Opinion for International Application No. PCT/US2012/044410 dated Mar. 4, 2013, 13 pages.

Business Wire press release. "uSamp Adding Mobile Surveying to Its Next-Generation Platform, Delivering Access to Millions of Smartphone Users on the Go," http://www.businesswire.com/news/home/20100825005047/en , 3 pages, Aug. 25, 2010.

Unni et al., "Location-Based Services: Models for Strategy Development in M-Commerce" (2003).

Final Office Action from U.S. Appl. No. 13/472,294 dated Mar. 15, 2013.

Final Office Action from U.S. Appl. No. 13/472,320 dated Mar. 29, 2013.

Johnson, T., "Make Extra Money: Become a Mystery Shopper," p. 1-3, Jul. 2, 2008.

"Field Agent," available at: www.fieldagent.net, retrieved Aug. 22, 2012.

"Gigwalk, Instantly mobilize people to do work anywhere," available at: www.gigwalk.com, retrieved Aug. 22, 2012.

"Shadow Cities—Magical location MMORPG for iPhone, iPod," available at: www.shadowcities.com, retrieved Aug. 22, 2012.

"SCVNGR—Wikipedia, the free encyclopedia," available at: http://en.wikipedia.org/wiki/SCVNGR, retrieved Aug. 22, 2012.

"Foursquare—Wikipedia, the free encyclopedia," available at: http://en.wikipedia.org/wiki/Foursquare, retrieved Aug. 22, 2012.

Kelly, "Gigwalk Adds Microsoft to Its List of Brands, Offers 110K Paying 'gigs' (Infographic)," available at: http://www.nytimes.com/external/venturebeat/2011/07/19/19venturebeat-gigwalk-adds-microsoft-to-its-list-of-brands-12055.html?partner=rss&emc—rss, The New York Times, Published Jul. 19, 2011, retrieved Aug. 22, 2012.

Finney, "iPhone app helps users make some extra cash," available at: http://abclocal.go.com/kgo/story?section=news/7_on_your_side&id=8441998, Published Nov. 22, 2011, retrieved Aug. 22, 2012.

Ahas et al., Mobile Positioning in Space-Time Behaviour Studies: Social Positioning Method Experiments in Estonia. Cartography and Geographic Information Science. 2007;34(4):259-73.

Lee et al., Efficient Mining of User Behaviors by Temporal Mobile Access Patterns. IJCSNS. 2007;7(2):285-91.

Ratti et al., Mobile Landscapes: using location data from cellphones for urban analysis. Environment and Planning B: Planning and Design. 2006;33(5):31 pages.

Tseng et al., Mining Temporal Mobile Sequential Patterns in Location-Based Service Environments. IEEE. 2007. 8 pages.

* cited by examiner

CONSUMER ANALYTICS SYSTEM THAT DETERMINES, OFFERS, AND MONITORS USE OF REWARDS INCENTIVIZING CONSUMERS TO PERFORM TASKS

CROSS-REFERENCE TO RELATED APPLICATIONS

This application claims priority under 35 U.S.C. § 119(e) to U.S. Provisional Application Ser. No. 61/708,305, titled "Consumer analytics system that determines, offers, and monitors use of rewards incentivizing consumers to perform tasks" and filed on Oct. 1, 2012, the entirety of which is incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE INVENTION

Some embodiments of the invention relate to systems for electronically gathering and analyzing information on and/or from consumers. More specifically, some embodiments of the invention collect relevant and timely data from and about consumers to make inferences and predictions about the consumers, including by collecting electronically-captured location data for the consumers, and provide incentives and/or rewards to the consumers for performing tasks to provide information to the system.

SUMMARY OF THE INVENTION

A method and system are provided for providing incentives and rewards to consumers in return for consumers' sharing of their electronically-derived consumer location data and performing tasks in response to requests for performance by the system. Performing tasks may include sharing opinions and feedback. The system may incent consumers to perform tasks by offering rewards in exchange for performance. Location-derived insights and information reported by the consumers may be used to segment and customize the available incentives and rewards for each consumer. Reward redemption analytics may be used to evaluate the effectiveness of reward customization.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

ILLUSTRATIVE CONTEXT

Figure 1:
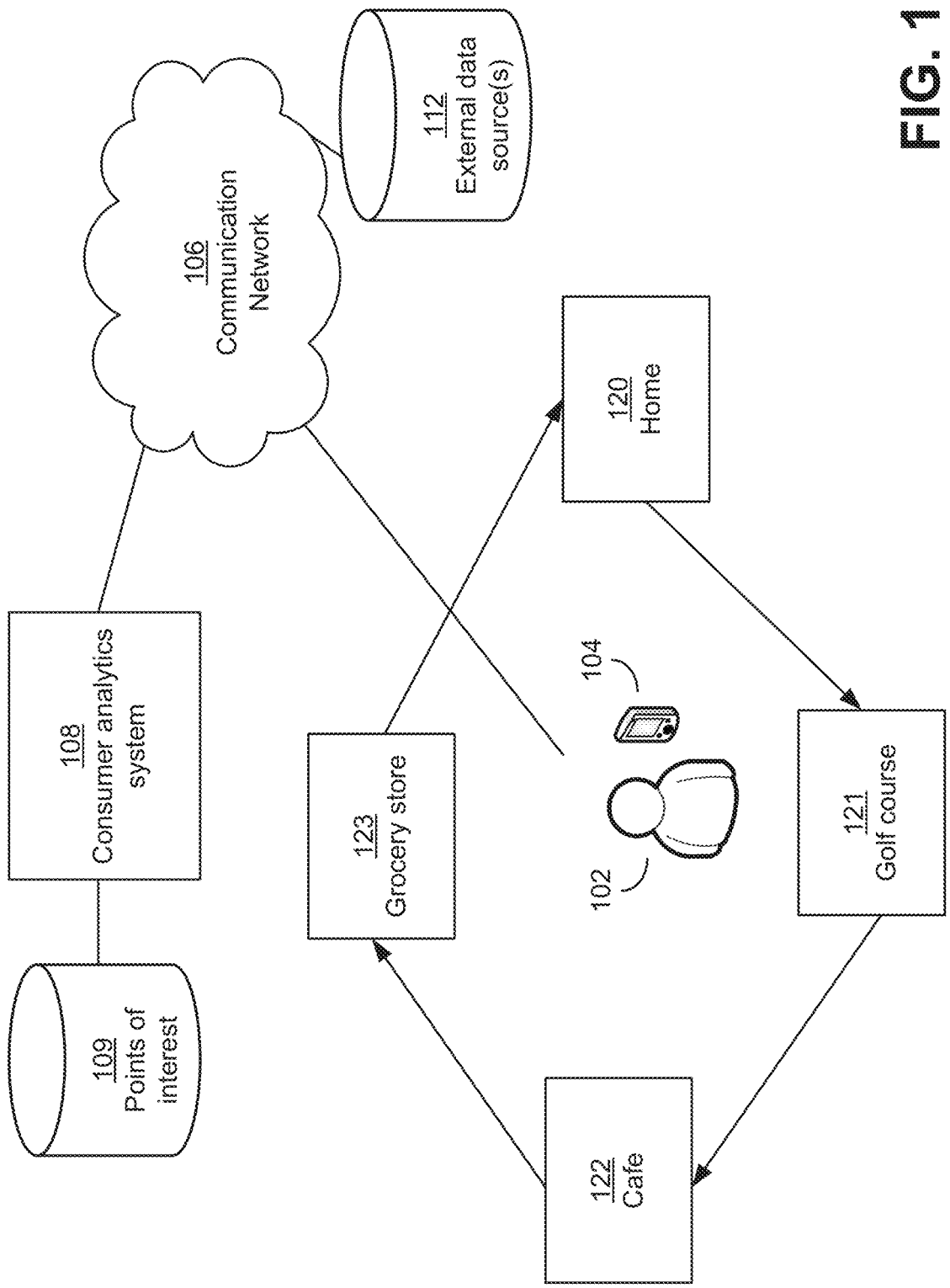
FIG. 1 illustrates one exemplary environment in which embodiments may operate.

FIG. 1 illustrates an exemplary environment in which some embodiments may operate to detect location data for one or more consumers and, by analyzing that location data, determine characteristics of those consumers. The example of FIG. 1 is described in connection with one consumer, but embodiments may operate with any number of consumers.

In the environment of FIG. 1, a consumer 102 changes location while going to work, going home, going to school, running errands, or moving from any other place to place. In the specific example of FIG. 1, the consumer 102 visits a golf course 121, cafe 122, and grocery store 123 during a day. The consumer analytics system 108 monitors movements of the consumer 102 and, by detecting and analyzing locations the consumer 102 visits, produces inferences and predictions regarding characteristics of the consumer, which may include inferences and/or predictions of behavior characteristics relating to behaviors of the consumer.

Embodiments may monitor movements of the consumer 102 in any suitable manner. In some embodiments, location data for a consumer may be collected for the consumer using techniques described in U.S. patent application Ser. No. 12/910,280, filed on Oct. 22, 2010, and titled "Electronically capturing consumer location data for analyzing consumer behavior" ("the '280 application"). The '280 application is incorporated herein by reference in its entirety for all purposes and at least for its disclosure of collecting and analyzing location data for consumers to predict and/or infer characteristics of the consumers. As discussed in detail below, in some embodiments, the consumer analytics system 108 may prompt a consumer 102 to perform one or more tasks (e.g., answer survey questions, or obtain media such as a photograph) in response to determining one or more characteristics of the consumer based on location data. For example, the consumer analytics system 108 may prompt a consumer 102 to perform a task when the consumer analytics system 108 identifies, from the location data for the consumer 102, a behavior in which the consumer 102 is inferred to be engaging, is inferred to have been engaging, or is predicted to engage. In some embodiments the system 108 may be configured to take an action, including prompting a consumer to perform a task, using techniques described in U.S. patent application Ser. No. 13/535,108, filed on Jun. 27, 2012, and titled "Triggering collection of consumer input based on location data" ("the '108 application"). The '108 application is incorporated herein by reference in its entirety for all purposes and at least for its disclosure of a system taking actions such as collecting information from and/or about consumers in response to predicting and/or inferring characteristics of the consumers.

In some embodiments, the consumer 102 is associated with a device 104 that can be used to obtain location information for the consumer 102 as the consumer 102 moves. The consumer 102 may move with the device 104, as the consumer 102 may carry the device 104 or the device 104 may be embedded in a car, piece of clothing, or baggage carried by the consumer 102. In some cases, the device 104 may be useful only in determining a location of the consumer 102, while in other cases the device 104 may have additional functionality. For example, the device 104 may be a mobile telephone with location-identifying capabilities, such as a cellular telephone with a built-in Global Positioning System (GPS) or Assisted GPS (AGPS) receiver that the cellular telephone can use to determine its current location. The device 104 may be able to communicate with a network 106, which may be any suitable communication network, including a wireless wide-area network (WWAN). In cases where the device 104 is a cellular telephone, the network 106 may be or include a cellular network.

The consumer analytics system 108 may obtain location data for a consumer 102 from the device 104. In some cases, the consumer analytics system 108 may request the location information from the network 106 and, in turn, the network 106 may obtain location data from the device 104. In some embodiments, the consumer analytics system 108 may request the location data at varying intervals based on various factors, including the current location of the consumer 102.

The consumer analytics system 108 may analyze the location data to identify settings visited by the consumer, including settings of the set of settings 109, and predict and/or infer characteristics of the consumer 102. Inferring and/or predicting characteristics of the consumer 102 may include inferring and/or predicting behaviors in which the consumer 102 is engaging, was engaging, or will engage.

A behavior may indicate a context of a consumer's presence at a point of interest. Examples of information indicating a context of a presence may include information indicating a purpose or goal of the consumer in visiting the point of interest, other points of interest visited by the consumer during a trip that includes the point of interest, other points of interest bypassed by the consumer in traveling to or from the point of interest, routes traveled by the consumer to reach the point of interest, an ultimate destination of a consumer in a trip that includes the point of interest, or any other information describing the circumstances of the consumer's presence at the point of interest. In some embodiments, when the system 108 infers and/or predicts one or more characteristics of one or more consumers (including the consumer 102), the characteristic(s) of the consumer(s) trigger the system 108 to take one or more actions.

The system 108 may take any suitable action, as embodiments are not limited to taking any particular action. In some embodiments, the action taken by the system 108 may include collecting information regarding commercial activity, including commercial activity of consumers. Commercial activity of a consumer may include information regarding visiting a commercial entity, purchasing a product or a service, and/or preferences of the consumer regarding commercial entities, products, and/or services. Commercial entities, products, or services about which information is obtained may be commercial entities, products, or services to which an inferred or predicted characteristic of the consumer 102 relates. For example, an inferred characteristic may relate to interactions of the consumer 102 with a commercial entity, such as behaviors or preferences of the consumer 102 with respect to the commercial entity. In such a case, the product or service about which information is obtained may be a product or service of the commercial entity. In other cases, the commercial entity, product, or service may not be related to an inferred or predicted characteristic, but may be a product or service for which market research is being conducted. Market research may be conducted to determine characteristics of consumers related to the commercial entity, product, or service, and the market research may include collecting information from or about consumers for which a characteristic has been inferred. When the characteristic is inferred for the consumer 102, then, the system 108 takes the action to obtain information about the product or service.

Embodiments are not limited to taking any particular action in response to inferring or predicting any particular characteristic. As an example of an action that the system 108 may take, in some embodiments, in response to inferring and/or predicting behavior of the consumer 102, the system 108 may solicit information from the consumer regarding commercial activity. To solicit the information, the system 108 may send the consumer 102 an alert or message on the device 104. The message sent to the device 104 may include a request for the consumer 102 to complete a task. The task may include providing information to the system 108, which may include information regarding commercial activity. In some cases, the task included in the message may include answering survey questions provided to the consumer 102. The consumer 102 may, in some embodiments, respond to survey questions using the device 104. Examples of other messages and tasks that may be provided to a consumer 102 by the system 108 are described in greater detail below.

As another example of actions that may be taken by the system 108 in response to inferring or predicting one or more characteristics of one or more consumers, the system 108 may acquire information from at least one data source external to the system 108. The information acquired from the at least one data source may be any suitable information, as embodiments are not limited in this respect. In some cases, the information may include information regarding the consumer 102, regarding an inferred characteristic, and/or regarding a commercial entity or a product or service offered by a commercial entity. For example, in response to inferring a characteristic of the consumer 102, the system 108 may obtain social networking data provided by a consumer to a social networking service or that relates to the consumer 102. The social networking data may be evaluated to determine whether the social networking data indicates information relating to the characteristic and/or to a product or service. For example, the social networking data may include a review of a product or service indicating opinions of the consumer 102 regarding the product or service. Examples of other types of external data sources from which information may be obtained are described in greater detail below.

In some embodiments, as described in detail below, the consumer analytics system 108 may incentivize the consumer 102 to perform a task in response to the action taken by the system 108, such as responding to a survey distributed by the system 108 or obtaining media (e.g., a photograph) requested by the system 108. As another example of an action the system 108 may take in response to inferring or predicting one or more characteristics of one or more consumers 102, the system 108 may determine one or more rewards to offer consumer 102 in exchange for performing a designated task.

Determining the one or more rewards may include determining one or more parameters of the reward. Determining parameters of the reward may include selecting whether the consumer is to be offered one reward or a list of multiple rewards from which the consumer may pick a reward. Determining parameters of a reward may additionally or alternatively include selecting an organization (e.g., a commercial entity) with which an offered reward is to be associated, selecting a type of reward, selecting a value of the reward, and/or selecting one or more conditions that are to be imposed on the availability of the reward to the consumer for redemption by the consumer. For example, where multiple different organizations offer rewards via the system 108, the system 108 may select an organization for which a reward is likely to incent the consumer 102 to perform a desired task. The organization may be an organization that the system 108 infers or predicts the consumer 102 favors and/or may be an organization related to the desired task. An organization that the consumer 102 favors may be a commercial entity of which the consumer 102 is a known, inferred, or predicted to be customer or that provides a product or service that the system knows, infers, or predicts is of interest to the consumer.

An organization related to the desired task may be a commercial entity about which the consumer 102 is to be asked questions in a survey. The type of reward and value of the reward may define what the consumer is to be provided by the organization with which the reward is redeemable. Examples of types of rewards include a discount on goods and services or a gift card. Examples of value include how much of a discount to offer on the goods/services and what value of gift card to offer. Conditions under which the reward may be redeemed may include any suitable conditions, including conditions on actions a consumer must take for the value of the reward to be made available or conditions on times or places at which the value of the reward is available.

The system 108 may determine a reward, including by determining any of the parameters mentioned above or other parameters of a reward, based on any suitable information. In some embodiments, the system 108 may determine a reward based on characteristics of the consumer 102 to which the reward is to be offered. For example, characteristics of the consumer 102 that the system 108 has inferred and/or predicted based on location data for the consumer may be used. Such characteristics may include behavior characteristics, preference characteristics, and/or identity characteristics that the consumer is inferred to have now or inferred to have previously had, or is predicted to have. For example, if a consumer 102 is detected by the system 108 to be a customer of one business, the system 108 may determine to offer a reward to the consumer that is a discount for goods and/or services available from the business. As another example, if a consumer 102 is detected by the system 108 to be a dedicated customer of one business, the system 108 may determine to offer a reward to the consumer that is a high-value gift card for a competitor of the business. By offering the consumer 102 a high-value reward for the competitor, the system may be able to determine whether the consumer 102 can be influenced to visit the competitor rather than the business typically visited by the consumer 102. In some embodiments, the system 108 may determine the type or value of a reward for the purpose of influencing a consumer 102 from being a customer of one business to being a customer of another, or so as to otherwise change the behaviors or preferences of the consumer 102. In some such cases, the system 108 may select different types/values of rewards to offer different consumers for the purpose of determining what type and value of reward will change the behaviors/preferences of customers of one business to be customers of another business. The different rewards may be similar in some parameters, such as by being of the same type but having different value, or by having the same type/value but different conditions, or similar in any other way.

In addition to or as an alternative to characteristics of the consumer, the system 108 may determine the reward to offer the consumer 102 based on one or more metrics regarding the consumer's performance of one or more tasks requested by the system 108. Such metrics may relate to a quality of the consumer's performance of the task for which the reward is offered or tasks previously performed. Examples of such metrics include a timeliness of the performance or a usefulness of information provided to the system 108 by the consumer 102 as a part of performing the task. For example, a usefulness of responses to open-response survey questions provided by the consumer 102 may be judged and used to determine a reward to provide to the consumer 102 for providing those responses or to provide at a future time to incent performance of another task. Though, the quantity (such as length in words) of an open-response may alternatively or additionally be used as an indication of quality.

Further, in addition to or as an alternative to performance metrics, in some embodiments the system 108 may determine the reward to offer the consumer 102 based on a value of the consumer 102 or information that may be provided by the consumer 102 to the system 108. For example, if the characteristics that are predicted/inferred for the consumer 102 by the system 108 indicate that the consumer 102 does not have any particularly-desirable characteristics or is not capable of providing any particularly-desirable information, the system 108 may select a lower-value reward for the consumer 102. However, if the characteristics for the consumer 102 indicate that the consumer 102 is valuable in some way, such as by having uncommon characteristics including by engaging in uncommon behaviors that are potentially indicative of some relevant information, the system 108 may select a higher-value reward for the consumer 102. Lastly, in some embodiments, the system 108 may determine the reward to offer the consumer 102 based at least in part on attributes of a task that the consumer 102 is to be requested to perform, for example, the system 108 may select the reward based on a difficulty of a task, or select a reward to include a parameter related to an attribute of the task. As an example of a related parameter, the system 108 may select a reward redeemable at a business to which questions the consumer is to be asked in a survey relate.

As another example of an action that may be taken by the system 108 in response to inferring or predicting a characteristic of the consumer 102, the system 108 may determine whether to inform the consumer 102 of the specific nature of the reward(s) that are to be offered to the consumer 102 to incent performance of a task. The system 108 may then provide information to the consumer 102 about the reward in accordance with that determination. For example, the system 108 may, when it is determined that the specific nature is not to be revealed, inform the consumer 102 that some reward will be made available. As another example, the system 108 may, when it is determined that the specific nature is to be revealed, inform the consumer 102 of the particular reward(s) that will be offered to the consumer 102. The system 108 may provide the consumer with information about the reward(s) at any suitable time. For example, the system 108 may provide the information about the reward(s)

before the consumer 102 performs the task, when the consumer 102 is to be incentivized to perform the task, or after the consumer 102 performs the task.

As another example of an action that may be taken by the system 108 in response to inferring or predicting a characteristic of the consumer 102, the system 108 may determine whether a reward is available for redemption by the consumer 102. In embodiments in which the system 108 provides rewards to consumers to incent the consumers to perform tasks, some of the rewards may be redeemable by the consumer only after one or more conditions are met. As mentioned above, such conditions may relate to limitations on a time at which the reward may be redeemed or a place the consumer must visit to redeem the reward, or may relate to behaviors in which the consumer 102 must engage before the reward may be redeemed. Accordingly, in some embodiments, when the system 108 processes location data for the consumer 102 to determine one or more characteristics of the consumer 102, the system 108 may determine whether one or more conditions for a reward have been met. If the system 108 determines that conditions for one or more rewards have been met, the system 108 may notify the consumer 102 that the reward/rewards is/are available for redemption.

As another example of an action that may be taken by the system 108 in response to inferring or predicting a characteristic of the consumer 102, the system 108 may compare characteristics of the consumer 102 predicted/inferred following the offering by the system 108 of and/or redemption by the consumer 102 of a reward to characteristics of the consumer 102 predicted/inferred beforehand. Conducting such a comparison may enable the system 108 to determine an impact of the reward on characteristics of the consumer 102. For example, the system 108 may determine whether, when the consumer 102 was offered a reward redeemable at a business, the consumer 102 became a more frequent customer of that business. This may enable the system 108 to determine whether the business is receiving a good return on the business's investment, in the case that the business pays a fee to the system 108 for the reward to be offered to consumers. Though, investment may alternatively or additionally be computed in other ways, such as based on the cost to the business of supplying rewards redeemed by consumers.

Comparing consumer behavior before and after being offered a reward may also enable the system 108 to determine whether rewards are skewing characteristics of consumers. While it may be desirable for a reward to influence behaviors of consumers to a degree, if the behavior of the consumers is swayed too much as a result of rewards, the influenced behaviors of the consumers may be too different from the consumers' normal behaviors for a study of the behavior to provide valuable information. Thus, in some embodiments, the consumer analytics system 108 may compare previously-determined characteristics and newly-determined characteristics for a consumer 102 in response to predicting or inferring one or more characteristics of the consumer 102. This comparison may be made for a consumer individually or for a group of consumers that are similarly situated. In some such embodiments, if the system 108 detects a difference in characteristics that may be indicative of skewing, the system 108 may notify an administrator or take other suitable action. The notification may identify the consumers believed to have been skewed and, if known, the rewards believed to have caused the skewing. In the case that skewing is detected, in some embodiments, rewards may be changed to rectify the skewing. For example, the system 108 may be configured to select a different reward for a skewed consumer, of the reward that caused skewing may be discontinued.

In some embodiments in which the system 108 offers a consumer 102 a reward for performing a task, the system 108 may include functionality to be informed when the consumer 102 redeems a reward. The system 108 may be able to receive information from the consumer 102, an organization with which the reward was redeemed, or any other party (e.g., a source of credit card information for a credit card the consumer 102 may have used in a transaction in which the reward was redeemed) regarding the redemption. The system 108 may be configured to take any suitable action in response to the reward being redeemed.

For example, the system 108 may be configured to determine, when information from an organization indicates a time and place at which the reward was redeemed, whether the consumer 102 was at that place at that time. By determining whether the consumer 102 was at the place of reported redemption at the time of reported redemption, the system 108 can determine whether the report of the redemption is accurate or is a potential sign of fraud. Fraud can arise, for example, when employees of a business falsely report a reward redemption. The system 108 can analyze other indicators of potential fraud, discussed in detail below, in response to receiving information informing the system 108 that a reward was redeemed.

As another example of an action the system 108 can take in response to receiving information indicating redemption of a reward, the system 108 may distribute information regarding the redemption to one or more other data stores, such as by distributing information to services outside of the consumer analytics system 108. For example, the consumer analytics system 108 may publish information regarding the redemption of the reward on one or more social media services. In some embodiments, the system 108 may be configurable with account information for one or more social media services that are used by a consumer 102. When the system 108 is so configured, the system 108 may publish to a consumer's account on a social media service that the consumer 102 has redeemed a reward. As another example of an action the system 108 can take in response to receiving information indicating redemption of a reward, the system 108 may determine attributes of the manner in which the reward was redeemed. For example, a time attribute for the redemption of the reward, such as a length of time between earning and redeeming the reward, may be determined for the consumer 102 and/or for a set of consumers who have redeemed the reward. As another example, a behavior attribute, indicating a behavior of the consumer at a time the reward was redeemed, may be determined for the consumer 102 and/or for a set of consumers who have redeemed the award. As another example, by comparing information regarding redemption of rewards by multiple consumers, differences in how different types or values of rewards may be identified or how consumers with different characteristics redeem the same rewards in different ways may be identified. When the system 108 determines information regarding a redemption of a reward, the system 108 may record this information in storage, present the information to an administrator of the system 108, a customer of the system 108 (e.g., an organization at which a reward may be redeemed), a consumer 102, or any other suitable party.

While in the examples given above the system 108 is described as taking the actions in response to predicting or inferring characteristics, it should be appreciated that the system 108 may be triggered to take the action(s) at any suitable time. In some embodiments, the system 108 may take the action contemporaneous with making the prediction/inference, such that the consumer 102 is prompted to perform a task and incented with a reward while the consumer 102 is at the location from which the characteristic was predicted/inferred. In other embodiments, however, the system 108 may prompt a consumer to perform a task and/or determine a reward at any time following the prediction/inference as embodiments are not limited in this respect. Examples of ways in which a consumer analytics system may process location data for multiple consumers, determine characteristics of consumers, and take actions based on determined characteristics are described in greater detail below. It should be appreciated that some of the examples below may not be described in connection with the illustrative environment described above in connection with FIG. 1. Embodiments are not limited to operating in any particular environment, including the environment of FIG. 1. Further, it should be appreciated that embodiments are not limited to acting in accordance with any of the examples below. In some of the examples below, tasks that a consumer may be requested to perform are answering survey questions and obtaining media (e.g., a photograph or video), but embodiments are not limited to requesting that a consumer perform any particular task. Additionally, in some examples below, an organization to which a task relates or with which a reward may be redeemed is referred to as a business or, specifically, an independent or chain retail chain/restaurant. It should be appreciated, however, that embodiments are not limited to operating with any particular type of organization, and that these are merely examples of commercial entities that may be organizations in some embodiments. Embodiments may operate in any suitable manner to process location data for consumers related to movements of the consumers in any suitable environment.

Illustrative Techniques

Figure 2:
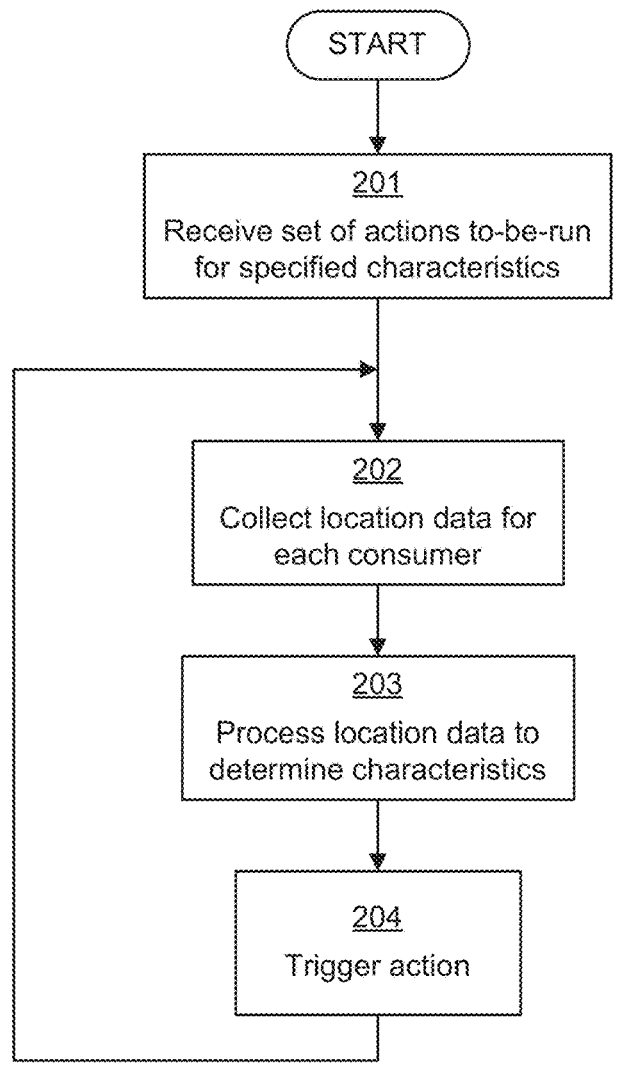
FIG. 2 is a flowchart of one exemplary process for triggering actions that gather information from and/or on consumers.

FIG. 2 illustrates one example of an overall process for collecting relevant and timely data from and about consumers to make inferences and predictions by using electronically-captured location data. The process of FIG. 2 begins in block 201, in which a set of actions to-be-triggered are input. The actions may be specified by any suitable one or more parties, as embodiments are not limited in this respect. In some embodiments, the actions may be specified by an administrator of a consumer analytics system. In other embodiments, the actions may additionally or alternatively be specified by one or more market researchers as part of defining a market research study. In embodiments in which the actions are specified as part of defining a study, the actions specified in block 201 may include actions to be taken by the consumer analytics system to collect information to be analyzed as part of the study. Actions to collect information may include actions to solicit information from one or more consumers and/or acquire information from one or more external data sources. Any suitable party may act as a market researcher in these embodiments, including professional market researchers or laymen doing market research. Additionally, the study may relate to any suitable topic. For example, a market research study may be carried out to determine characteristics of consumers that relate to a setting, of the set of setting 109 of the environment of FIG. 1, based on information about consumers of interest. The setting of the set 109 may be a commercial entity, such as a retail business.

Any suitable information regarding actions to be taken may be specified in block 201. In some embodiments, information describing the action to be taken may be specified. For example, where the action includes requesting that a consumer perform a task, the task may be described. Any suitable task to be performed by a consumer may be included in an action, as embodiments are not limited in this respect. In some cases, a task may include prompting a consumer to answer survey questions, in which case the survey questions and, optionally, acceptable answers to the questions may be specified in block 201. In other cases, a task may include prompting a consumer to obtain media or scan a Universal Product Code (UPC) barcode or Near Field Communication (NFC) tag, in which case the subject of the desired media or the object desired to be scanned may be specified in block 201. In still other cases, a task may include requesting that a consumer visit a setting and provide information or opinions about the setting, such as providing opinions regarding an arrangement of items in a setting, and the setting and topic of the desired opinion may be specified in block 201.

Additionally, specifying the action in block 201 may include specifying one or more conditions that, when satisfied, will result in the consumer analytics system taking the action. Any suitable conditions may be specified, including conditions related to one or more characteristics of one or more consumers determined from location data. For example, a condition may be satisfied when the consumer analytics system determines, from location data for a consumer, a characteristic of a consumer. A characteristic of a consumer may be a behavior characteristic of a consumer relating to a behavior in which the consumer was engaging when the location data was derived. Such a characteristic may be, for example, that the consumer is a customer of a commercial entity. As another example of a condition, a condition may be satisfied when the consumer analytics system determines a characteristic of a group of consumers. A characteristic of a group of consumers may be a characteristic of the group and not of individual consumers of the group (e.g., an average characteristic for the group) or a characteristic shared by consumers of the group. As another example of a condition, a condition may be satisfied based on an evaluation of a characteristic that describes a behavior. For example, a behavior characteristic may relate to a frequency with which a consumer performs a behavior, such as a frequency with which the consumer visits a retail business. An example of a condition that may be associated with an action is a condition that a behavior characteristic indicates that a frequency of a consumer's visits to a retail business is greater than two visits per month.

In one illustrative example of an action and a condition, an action includes requesting that a consumer respond to survey questions regarding a commercial entity for which market research is being conducted, and a condition for the action is that an analysis of location data for a consumer produces an inference that the consumer is a customer of the commercial entity. This action and condition may be specified in block 201. Subsequently (as discussed below), when location data for a consumer is analyzed and a characteristic indicating that a consumer is a customer of the commercial entity is inferred, the consumer analytics system may prompt that consumer to provide responses to the survey questions. The action taken by the consumer analytics system to prompt the consumer may be taken by the system contemporaneously with the consumer's presence at a location from which the characteristics satisfying the conditions were inferred. As another example, a system may infer from location data that consumers of a group of consumers who frequently shop at one store (or type of store) are visiting a competitor store not frequently visited by consumers of the group. In response to drawing the inference, the system may survey individual consumers who are members of the group to determine a purpose of the consumers' visits to the competitor store. The surveying may be conducted electronically, by transmitting messages to the consumers, and may be performed contemporaneously with the consumer's visit to the competitor store.

In block 202, location data is obtained for multiple consumers. Any suitable location data may be obtained, as embodiments are not limited in this respect. Location data may, in some embodiments, include geographic location data identifying a geographic location that results from a location measurement performed by a computing device using a location identification system like the Global Positioning System (GPS). A geographic location of a consumer may be defined according to a latitude, longitude, altitude, and/or margin of error that identifies the precision of the latitude, longitude, and altitude. Location data may also include time data indicating a time at which the location data for the consumer was obtained. Illustrative examples of location data are discussed below.

The location data may be obtained in any suitable manner. Examples of location data that may be obtained and ways in which location data may be obtained are discussed in detail below and in the '280 application that is incorporated herein by reference. In some embodiments, the location data for a consumer may be obtained in part using an electronic device associated with a consumer. The electronic device may be any suitable portable device that may move along with the consumer. The device may be carried by the consumer or may be integrated into an item associated with the consumer (e.g., integrated into a car, baggage, or clothing). The electronic device may obtain location data or be used in obtaining location data. Location data obtained by the electronic device may be transmitted to a consumer analytics system at any suitable time and in any suitable manner. In some embodiments, the electronic device may continuously or occasionally transmit location data for the consumer to a consumer analytics system without receiving a request for the location data from the system. In other embodiments, the consumer analytics system may occasionally request location data from the electronic device and the electronic device may transmit the location data upon receipt of the request. In still other embodiments, the electronic device may transmit location data without request at some times and the consumer analytics system may request location data at other times.

In block 203, the location data for each consumer of the multiple consumers is processed to determine characteristics for the consumers. As described in the '280 application that is incorporated herein by reference, the characteristics for a consumer that may be determined from location data include behavior characteristics, preference characteristics, and identity characteristics. In block 203, determining the characteristics of a consumer includes predicting and/or inferring behavior characteristics of the consumer. The behaviors of a consumer that may be indicated by characteristics may include visiting a particular setting (e.g., a particular store), doing a specific activity such as playing golf, or traveling via a specific mode of transportation. The processing of location data of block 203 may be performed by the consumer analytics system contemporaneously with the consumer's movements, as the location data is obtained for the consumer, such as while the consumer is visiting a setting or moving to one or more settings on a path.

As part of the processing of location data for the consumers, the consumer analytics system may determine whether to take an action, including whether to request that the consumer perform a task. To determine whether to take an action, characteristics of consumers inferred and/or predicted during the processing of block 203 are compared to conditions for actions specified in block 201. When conditions for an action are satisfied, the consumer analytics system may take the action. Accordingly, in block 204, based on the characteristics of the consumer inferred or predicted in block 203, an action is triggered when the characteristics satisfy one or more conditions. As discussed above, any suitable actions may have been specified in block 201 and may be taken in block 204. Actions may include prompting a consumer to perform a task, such as by sending a consumer one or more survey questions to respond to. The actions may additionally or alternatively include obtaining additional data from an external data source, such as data related to the consumer. Data related to the consumer may include sales transaction data, information entered into social networking or other system, or any other information. The actions may additionally or alternatively include determining a reward to incent a consumer to perform a task, notifying a consumer about a reward, determining whether a reward is available for redemption, determining an effect of a reward on a consumer's characteristics (including behaviors), and/or monitoring attributes of a manner in which a reward is redeemed and/or monitoring for potential fraud in redemption. As another example, actions may include adjusting one or more parameters of a visit detection process. The action taken by the consumer analytics system may be taken at any suitable time, including contemporaneously with the consumer's movements.

DETAILED DESCRIPTION OF SOME EMBODIMENTS

System Overview

Some embodiments include a consumer analytics system, implemented on a computing device, with a configured set of actions. The consumer analytics system may include a facility for processing location data, a set of points of interest, and a set of actions which can be performed. The facility may be executed by the computing device.

Techniques operating according to principles described herein may be implemented in any suitable manner. For example, the methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of example, methods, program codes, program instructions and the like described herein may be implemented in one or more threads. The threads may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like. "Storage medium," as used herein, refers to tangible storage media. Tangible storage media are non-transitory and have at least one physical, structural component. In a storage medium, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. A software program may be associated with a server that may include a file server, print server, domain server, internet server, intranet server and other variants such as secondary server, host server, distributed server and the like. The server may include one or more memories, processors, storage media, ports (physical and virtual), communication devices, and/or interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

A software program may be associated with a client that may include a file client, print client, domain client, internet client, intranet client and other variants such as secondary client, host client, distributed client and the like. The client may include one or more memories, processors, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, and instructions described herein may be executed by one or more of the network infrastructural elements.

The methods, program codes, and instructions described herein and elsewhere may be implemented on a cellular network having multiple cells. The cellular network may either be frequency division multiple access (FDMA) network, a time division multiple access (TDMA) network, and/or a code division multiple access (CDMA) network, or any other suitable form of network implementing any suitable communication protocol and any suitable medium access control protocol. The cellular network may include mobile devices, cell sites, base stations, repeaters, antennas, towers, and the like. The cell network may be a network carrying out a protocol for Global System for Mobile Communications (GSM), General Packet Radio Service (GPRS), any third-generation (3G) network, Evolution-Data Optimized (EVDO), ad hoc mesh, Long-Term Evolution (LTE), Worldwide Interoperability for Microwave Access (WiMAX), or other network types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon.

Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

Computer software, program codes, and/or instructions may be stored and/or accessed on machine readable storage media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; or other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the drawings and descriptions herein set forth functional aspects of the disclosed systems, no particular arrangement of software for implementing these functional aspects should be inferred from these descriptions unless explicitly stated or otherwise clear from the context. Similarly, it will be appreciated that the various steps identified and described herein may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described herein, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being stored on a machine readable medium.

Computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described herein and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described herein may include any of the hardware and/or software described herein. All such permutations and combinations are intended to fall within the scope of the present disclosure.

Figure 3:
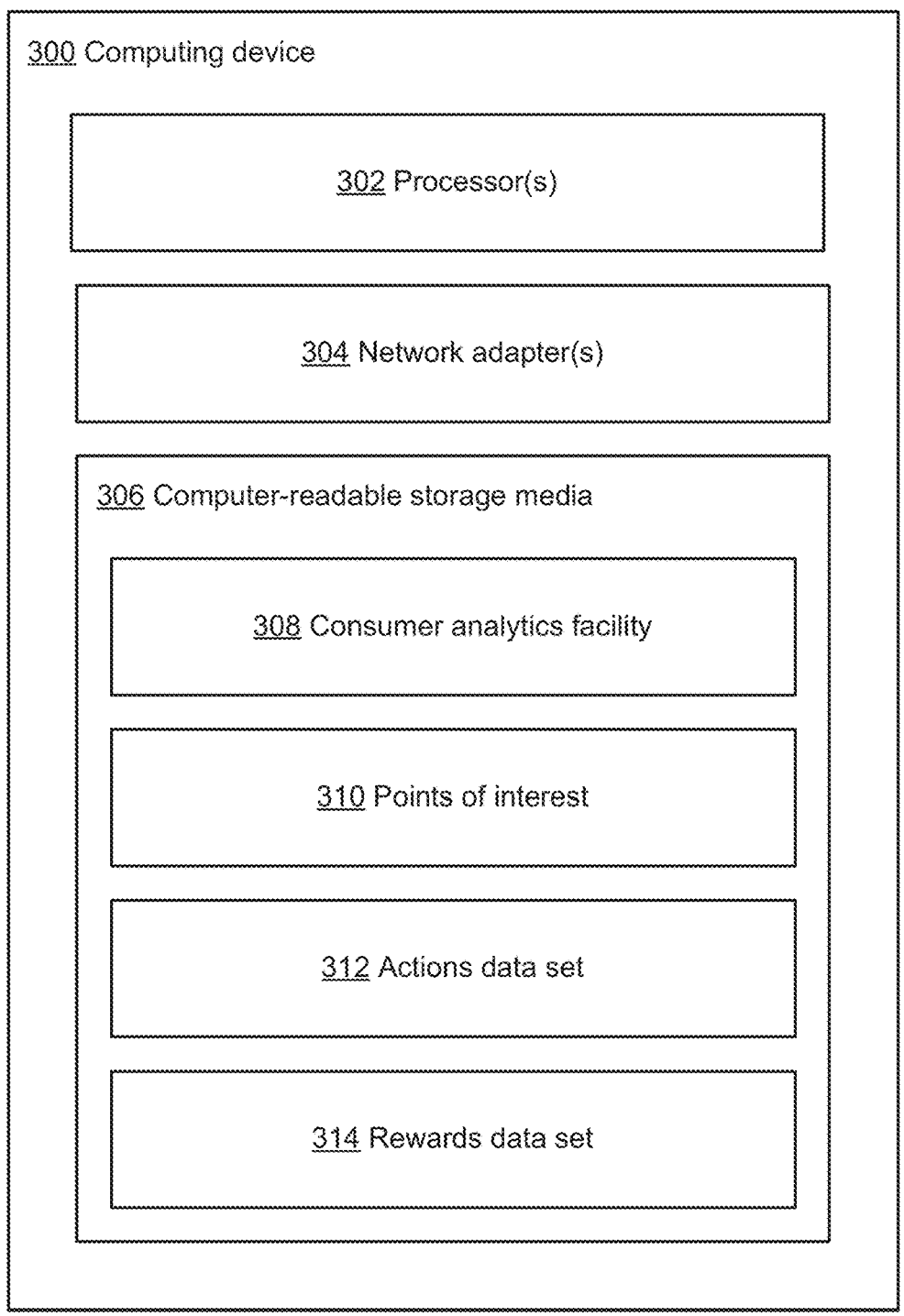
FIG. 3 is a block diagram of one exemplary computing device with which embodiments may operate.

FIG. 3 illustrates one exemplary implementation of a computing device in the form of a computing device 300 that may be used in a system implementing the techniques described herein, although others are possible. It should be appreciated that FIG. 3 is intended neither to be a depiction of necessary components for a computing device to operate in accordance with the principles described herein, nor a comprehensive depiction.

Computing device 300 may comprise at least one processor 302, a network adapter 304, and computer-readable storage media 306. Computing device 300 may be, for example, a desktop or laptop personal computer, a server, a collection of personal computers or servers that operate together, or any other suitable computing device. Network adapter 304 may be any suitable hardware and/or software to enable the computing device 300 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 306 may be adapted to store data to be processed and/or instructions to be executed by processor 302. Processor 302 enables processing of data and execution of instructions. The data and instructions may be stored on the computer-readable storage media 306 and may, for example, enable communication between components of the computing device 300.

The data and instructions stored on computer-readable storage media 306 may comprise computer-executable instructions implementing techniques that operate according to the principles described herein. In the example of FIG. 3, computer-readable storage media 306 stores computer-executable instructions implementing various facilities and storing various information as described herein. Computer-readable storage media 306 may store a consumer analytics facility 308 for obtaining location data for consumers via network adapter 304 and determining characteristics, including behaviors, of the consumers. The consumer analytics facility 308 may perform any of the exemplary techniques described herein, and may include any of the exemplary facilities described herein. Computer-readable storage media 306 may also include data sets to be used by the consumer analytics facility 308, including a data set 312 of actions that the facility 308 can be configured to prompt a consumer to take and their associated triggering values, a data set 310 of points of interest, which may include information about locations and types of points of interest, and a data set 314 of rewards, including information on parameters of rewards eligible to be offered to consumers.

While not illustrated in FIG. 3, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

While the invention has been disclosed in connection with the preferred embodiments shown and described in detail, various modifications and improvements thereon will become readily apparent to those skilled in the art. Accordingly, the spirit and scope of the present invention is not to be limited by the examples herein, but is to be understood in the broadest sense allowable by law.

Examples of Techniques for Obtaining Location Data

As mentioned above, embodiments are not limited to implementing any particular technique for obtaining location data. In some embodiments, techniques for obtaining location data described in the '280 application incorporated herein by reference may be implemented.

In some embodiments, a system may use one or more of many different methods for gathering consumer location data based on a personal device (such as a mobile phone, tablet, or laptop computer). Location data may include information identifying a geographic location. Information identifying a geographic location may include latitude, longitude, altitude, and an error measure. Location data may also include a timestamp. In some embodiments, an electronic device associated with and/or operated by a consumer may determine the location data alone and transmit the determined location data to a consumer analytics system. In others, one or more other devices, such as components of a network to which the electronic device is connected and/or able to communicate, may cooperate with the electronic device to determine the location data.

Techniques for obtaining location data that may be used in embodiments include techniques for measuring a physical location of a consumer. Techniques for measuring a location including cell tower identification, enhanced cell identification, Uplink-Time difference of arrival, Time of arrival, Angle of arrival, enhanced observed time difference (E-OTD), GPS, Assisted-GPS, hybrid positioning systems, Global Navigation Satellite System (GLONASS), the Galileo navigation system, location-determination services using access points for wireless local area networks (WLANs), and the like.

In some embodiments, location data comprising measurements of physical location may additionally or alternatively be obtained using paging, triangulation, and the like. A common method is to triangulate a location of the device based on nearby towers that provide wireless phone/data service. In the case of mobile phones, the phones may emit a roaming signal to contact the next nearby antenna tower. The phone's position can be figured out by multilateration based on the signal strength of nearby antennas. A similar method is to do a similar triangulation but instead of using towers used to provide wireless service, use Wi-Fi or other similar systems. This may be particularly useful in cases in which mobile tower signal is poor (in remote areas, for example) or not available on the device.

In some embodiments, in addition to or as an alternative to obtaining location data that includes measurements of physical location using satellite-based systems and/or triangulation, location data may be determined from information stored by data sources that are linked to the user and/or device. Such data may include identifications by a user of setting visited by the consumer or that the consumer is visiting. For example, if a consumer provides information to a data source indicating a location of the consumer, that information may be used in identifying a location of the consumer. Such information may include a message posted to a social networking service saying "I just arrived in Boston." From the user's statement of his or her location, a consumer analytics system with access to the information can infer that the consumer is in the vicinity of Boston. Additionally or alternatively, predictions of location may be used. Predictions may be obtained in any suitable manner. For example, by using an accelerometer built into an electronic device that is carried by a consumer (e.g., an accelerometer of a mobile phone), a speed the consumer is traveling may be estimated and used along with a last known location for the consumer to estimate a current location of the consumer. In some embodiments, multiple different kinds of data indicative of location may be analyzed together in determining locations visited by consumers, which may increase the amount and quality of location data.

In some embodiments, different data sources may also be used to increase the quality of the data collected by changing which data sources are used and how often the data sources are polled. For example, if location data indicates a consumer is moving, it may be useful to increase the rate at which data is gathered.

Location data for consumers may be obtained by a consumer analytics system in any suitable manner. In some embodiments, location data can be pulled by the system. To pull the location data, the consumer analytics system may query a communication network, such as a communication network to which an electronic device associated with a consumer is connected.

The network may locate the device in response to the query and produce location data and/or request that the device provide location data. In other embodiments, the consumer analytics system may obtain location data for a consumer by having an electronic device associated with the consumer push location data to the consumer analytics system periodically. In some embodiments in which a device pushes location data periodically, it may be desirable that the device obtains location data and sends the location data to the system automatically and transparently to a consumer associated with the device, without receiving input from the user.

Examples of Processing Location Data to Build a Consumer Profile

The consumer analytics system may receive multiple different units of location data for any given consumer over time. The location data for a consumer may be in the form of a set of data points that each identifies a location through which the consumer passed.

From analyzing this location data, a consumer analytics system may generate a unique list of settings visited by each consumer. The list may be "unique" in that the list does not include multiple entries corresponding to a single visit by a consumer to a setting, or because the list does not include multiple listings for a setting. To generate the unique list, the consumer analytics system may identify "anchors" from locations that are similar in time and space. The consumer analytics system may also identify settings corresponding to the anchors and may produce information about a consumer based on the settings visited by a consumer. Additionally, by analyzing the unique list of physical locations and/or settings visited by a consumer, patterns can be identified in the settings that may be used by the consumer analytics system to determine characteristics of a consumer. For example, an identity, behaviors, and preferences of the consumer can be identified through analysis of location data. The location data that is analyzed may include an identification of locations at which the consumer was present and/or settings visited by the consumer. Additionally, personally-relevant locations for the consumer, such as the place of residence and place of employment of the consumer, can be determined through analysis.

The consumer analytics system may also examine sets of location points corresponding to movement, rather than only location points corresponding to stops the consumer made at particular locations, to determine characteristics of a consumer. Location data corresponding to movement may provide information about paths traveled by a consumer. For example, by using the distance and time between points, the consumer's speed can be computed. The consumer's speed, along with whether or not the points are over roads, rail lines, etc. may be used to determine if a consumer is traveling by car, rail, plane, etc. In addition, the distance from the consumer's home of a location visited by a consumer can be computed using information about a path.

The '280 application that is incorporated herein by reference describes in detail techniques that may be implemented in some embodiments for determining anchors, paths, and settings from location data for a consumer. The '280 application also describes in detail techniques that may be implemented in some embodiments for analyzing location data, anchors, paths, and settings to determine characteristics of consumer.

Visit Detection

In some embodiments, when a consumer analytics system receives location data for a consumer, the consumer analytics system may perform a visit detection process on the location data to identify settings visited by consumers. A setting may be a place to which a location corresponds, such as a commercial or non-commercial place (e.g., business or park). A position of a setting may correspond to a set of physical location falling within defined location boundaries of the setting, as discussed below. When a consumer is detected to have been present at a location falling within the location boundaries of a setting, through a visit detection process the consumer can be detected to have visited the setting.

A visit detection process may be performed by a consumer analytics system in any suitable manner, as embodiments are not limited to identifying settings visited by consumers in any particular way. Examples of ways in which a visit detection process may be carried out are described below and in the '280 application that is incorporated by reference herein.

A visit detection process may be carried out because, in some embodiments, one element of detecting consumer characteristics, including behavior characteristics, from location data is to determine what stores, restaurants, sports venues, and other settings a consumer visits. The process 400 of FIG. 4 is an example of a visit detection process that may be carried out in some embodiments.

Figure 4:
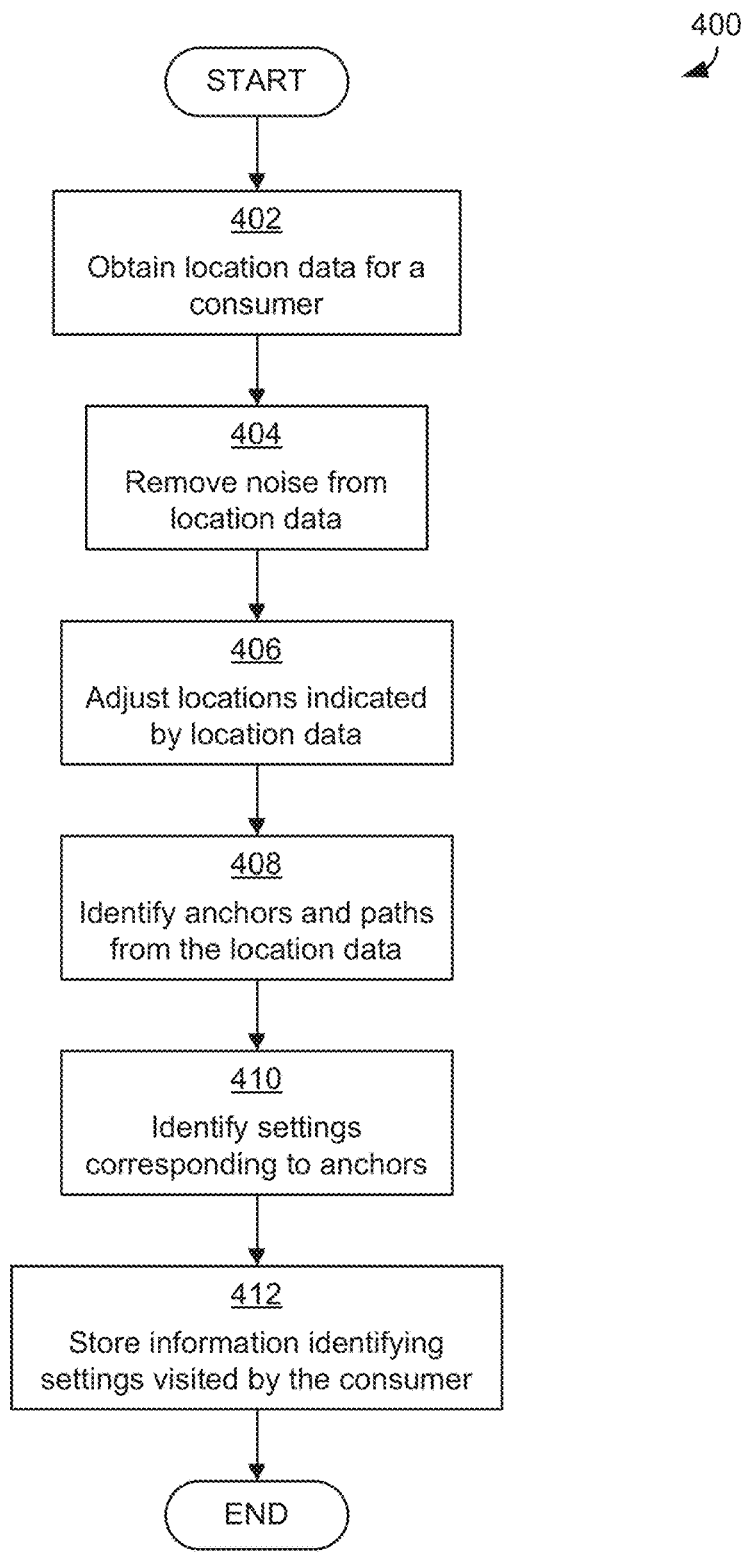
FIG. 4 is a flowchart of an example of a process for determining a setting visited by a consumer based on location data obtained for the consumer.

The process 400 of FIG. 4 begins in block 402, in which a set of location data points for a consumer is obtained. The location data points may be obtained in any suitable manner, examples of which are described above. In block 404, the location data may be analyzed to remove "noise" from the location data points. Noise in the location data points may include location data points that are not valid. Invalid location data points may include points indicating locations that are not physically possible or very unlikely. Impossible or unlikely location data points may include data points such as:

Points that indicate the consumer is traveling faster than the speed of sound; and A trail of connected points roughly following a line with one outlier that is clearly disconnected.

In order to remove the noise in block 404, the consumer analytics system can traverse the location data points for a consumer one-by-one and discard any location data points that do not meet one or more criteria for not being noise or satisfy one or more criteria for being noise. Criteria for being noise may include detecting that a location data point is either physically impossible or very unlikely, or any other suitable criteria.

Once noise is removed in block 404, as part of the processing of location data, in block 406 the consumer analytics system may enhance the data by adjusting locations indicated by location data. For example, location data points may be pushed from unlikely places to likely places. As an example, if the time and distance between points and altitude indicate the consumer is likely traveling in a car, the points obtained during this time could be cross-referenced with the known location of roads. The points could be moved to correspond to a road, which is most likely where the point is given that the car would likely be driving on roads. Adjusting the location data points in this way may compensate for errors in the locations identified by location data points, such as errors that may result from imprecise processes for obtaining location data.

Once a good set of location data points for a consumer have been obtained through processing of block 402-406, the location data points can be analyzed to identify travel paths ("paths") and stationary locations ("anchors"). Paths and anchors may be identified by the consumer analytics system in block 408 by looking at the time and distance between points and by applying a clustering algorithm. For example, such a clustering of the sequential location points may be carried out using Euclidian distance clustering. In one example of a Euclidean distance clustering, locations within 200 meters of one another may be identified as being related to a same potential anchor. In some embodiments, each location identified by location data processed by the consumer analytics system may include an uncertainty radius. The uncertainty radius around each location may be used to more accurately cluster nearby location points using statistical methods. When a location indicated by a location data point is similar to a location indicated by another location data point and is within the uncertainty radius of the other location data point, the consumer analytics system may conclude that the location data points both relate to one location visited by a consumer. An anchor may be identified at least in part as a cluster of locations corresponding to multiple different location data points. Additionally, by comparing time differences between location points related to the same potential anchor, a duration of time spent by consumer at the potential anchor can be determined. Each cluster of locations associated with a duration above a threshold, such as duration of greater than five minutes, may be identified by the consumer analytics system as an anchor. In some embodiments, the calculated location for an anchor may be a geometric mean of the individual location data points associated with the anchor.

In block 410, the consumer analytics system may use the anchors to identify settings visited by a consumer. The consumer analytics system may utilize a data set of settings, including Points of Interest (POIs), to identify settings, including identifying locations corresponding to POIs defined in the data set. The data set may include a collection of places of one or more kinds (e.g., stores, restaurants, sports venues, transportation terminals, office buildings, etc.) that a consumer may visit. Each setting in the data set may be defined at least in part as a polygon that defines a location of the point of interest. Examples of ways in which the polygon may be defined are described in detail below. Additionally, in some embodiments, information regarding a setting may include a set of operational information (e.g., the hours of operation, the operational type, e.g., a terminal for plane/boat/rail travel, etc.) and a set of categorical information about the setting (e.g., a retail location, restaurant, or stadium).

The consumer analytics system may identify the settings visited by the consumer by examining each anchor and determining a likelihood that the consumer visited the given POI. A consumer analytics system may determine the likelihood in any suitable manner, as embodiments are not limited in this respect. In some embodiments, the likelihood may be calculated by the consumer analytics system based on a number of factors, including:

the likelihood that a cluster of location points representing the anchor corresponds to a location within the bounds of the POI;

whether the time range of the anchor falls within the operational hours of the POI;

whether the anchor duration falls with the expected visit duration to the given POI (e.g., consumers typically spend 1.5-3 hours at movie theatre; a visit of 30 minutes is unlikely);

whether the already-computed behavior of the consumer indicates that she is likely to visit the POI or visit the POI at the time-of-day, day-of-week, time-of-year, etc. at which location data for the anchor was collected;

and any other suitable factors.

When a likelihood of an anchor matching a setting is calculated by the consumer analytics system, the likelihood may be compared to a threshold. If the likelihood exceeds the threshold, the anchor may be determined to correspond to the setting and the consumer may be determined to have visited the setting. Any suitable threshold having any suitable value may be used, as embodiments are not limited in this respect. Additionally, the threshold may be used for any suitable number of settings. In some embodiments, the same threshold may be used by the consumer analytics system for all settings, such that each time the consumer analytics system calculates a likelihood of an anchor corresponding to a setting, the likelihood may be compared to the threshold. In other embodiments, different thresholds may be used for different settings. In some embodiments that use multiple different thresholds, each setting in the set of settings that can be identified through the visit detection process may be associated with an individual threshold corresponding to that setting. When a likelihood of a consumer visiting the setting is calculated, the likelihood may be compared to the threshold for that setting. In other embodiments that use multiple different thresholds, a group of multiple settings may share a threshold. Any suitable group of settings may be defined, as embodiments are not limited in this respect. Settings having a similar location or being of a similar type may be grouped in some embodiments.

In block 412, once the consumer analytics system has matched location data for consumers to settings visited by the consumers in block 410, the consumer analytics system may store information resulting from the determination of block 410. The stored information may include information identifying that a consumer has visited a setting, when an anchor for a consumer was determined to match a setting. The stored information may also include information identifying that an anchor of a consumer was not matched to any settings, if the consumer analytics system could not match an anchor to settings. Once the information is stored in block 412, the process 400 ends.

Following the process 400, the information stored by the consumer analytics system may be used in any suitable manner. For example, as discussed herein and in the '280 application incorporated herein by reference, settings visited by consumers may be analyzed to determine characteristics of consumers and/or to conduct market research. Characteristics of consumers determined from the settings may also be compared to conditions for actions, and a consumer analytics system may take an action in response to determining that one or more characteristics of one or more consumers satisfy conditions for an action. As another example, information identifying that an anchor for a consumer does not match any settings for which the consumer analytics system has information may prompt adjustments to the visit detection process, including adjustments to definitions of settings. As discussed in detail below, in some cases in which the consumer analytics system cannot match an anchor for a consumer to a setting, the consumer and/or an administrator of the consumer analytics system may be prompted to provide information about the location visited by the consumer and this information may be used to define a setting. Once the setting is defined, the consumer analytics system may be able to match anchors to that setting.

The exemplary visit detection process described above in connection with FIG. 4 was described as being carried out by a consumer analytics system in response to receiving location data from a source of location data, such as a device associated with a consumer. It should be appreciated, however, that embodiments are not limited to implementing the visit detection process on a server or any other computing device that receives location data from another device. In some embodiments, a device that measures a physical location of a consumer may perform a visit detection process. In such cases, the device may measure the physical location of the consumer over time and apply a visit detection process as above by comparing locations of the consumer to definitions of settings. The set of settings may be stored on the device that measures the location and performs the visit detection process or may be stored elsewhere accessible to the device, such as on a server that the device may communicate with over a network (e.g., a local network or a wide-area network such as the Internet).

Triggering Data Collection Actions Based on Determined Consumer Characteristics

In some embodiments, location data, as well as settings visited by a consumer and/or paths or trips taken by consumers, may be analyzed by the consumer analytics system to infer and/or predict characteristics of consumers or groups of consumers. The characteristics of consumers may be used to build profile about consumers, and these profiles may be used to perform market research. In addition, in some embodiments, location data can be used to discover when a consumer exhibits characteristics of interest, including performing a behavior of interest.

A characteristic of interest, including a behavior of interest, may be any suitable characteristic (including a behavior characteristic) of a consumer that may be determined from location data and in which a market researcher may be interested. Characteristics of interest, as mentioned above, may be related to conditions of an action that may be taken by a consumer analytics system. The characteristics may relate to commercial activities of consumers. For example, a market researcher may be interested in better understanding how consumers choose which kind of peanut butter to buy. By processing consumers' location data and identifying, using a visit detection process, stores visited by consumers, the consumer analytics system may be able to detect when a consumer has arrived at or was present at a store that sells peanut butter. In response to inferring a behavior characteristic for a consumer indicating that the consumer has visited the store, the consumer analytics system may take an action that includes sending the consumer a message prompting the consumer to answer survey questions. The survey questions may ask whether the consumer bought peanut butter, which, if any, kinds of peanut butter the consumer bought, and why, and/or kinds of peanut butter the consumer did not buy and why not. The consumer's responses to these survey questions may aid the market researcher in understanding the mindset that went into the consumer's decision to purchase peanut butter.

As mentioned above, characteristics of a consumer that may be determined from location data include behavior characteristics of consumers that relate to behaviors of the consumers. Behaviors of consumers may include behaviors that extend for a period of time. For example, a consumer's visit to a setting or a consumer's shopping trip that includes visiting one setting and driving past another setting may be behaviors that extend for a period of time (e.g., the period of time the consumer was at a setting). When a behavior extends for a period of time, in some embodiments a consumer analytics system may obtain location data for the consumer, determine characteristics for the consumer, and carry out an action while the behavior is ongoing. In some such embodiments, the consumer analytics system may determine characteristics of consumers and take action contemporaneously with a consumer's behavior by determining the characteristics and taking action when the consumer is predicted to be about to engage in a behavior, when the consumer is determined to be engaging in the behavior, when the consumer is determined to have recently ended a behavior, and/or when the consumer is detected to be about to end a behavior. A consumer analytics system may take an action contemporaneously with a consumer's behavior when the consumer has not yet engaged in another behavior or moved in a manner from which the consumer analytics system has determined another behavior of the consumer.

As discussed above in connection with FIG. 2, a consumer analytics system may receive input defining any suitable action to be taken in response to any suitable condition(s). The condition(s) may relate to any suitable one or more characteristics of one or more consumers determined by a consumer analytics system from location data for one or more consumers. The characteristic(s) that may be determined by the consumer analytics system and that may satisfy conditions for an action may include one or more characteristics of a single consumer inferred or predicted by the consumer analytics system. Additionally or alternatively, the characteristics may include one or more characteristics that are shared by consumers of a group of consumers and that are inferred or predicted by the consumer analytics system, or one or more characteristics of a group that are not associated with any particular consumer (e.g., an average characteristic for a group). The characteristics that may be determined for one or more consumers may be characteristics that relate to commercial activity of one or more consumers.

As mentioned above and as described in detail in the '280 application incorporated herein by reference, characteristics for one or more consumers that may be inferred or predicted by a consumer analytics system may include behavior characteristics, identity characteristics, or preference characteristics.

Behavior characteristics may include any suitable information regarding behaviors of a consumer. Characteristics of behaviors may include information about activities in which a consumer does or does not participate or a manner in which the consumer participates in an activity. Information on a manner in which the consumer participates in an activity may include information on a frequency or periodicity of the consumer's participation in the activity. Additionally, predictions of whether a consumer is likely to participate in an activity may be inferred or predicted as behavior characteristics. Behaviors of a consumer may include retail-relevant behaviors and lifestyle-relevant behaviors. Retail-relevant behaviors may include behaviors relating to commercial activities engaged in by a consumer. Commercial activities may include activities in which a monetary transaction takes place or could take place, including visits to any location at which consumers could purchase products or services. Lifestyle-relevant behaviors may include information about consumers' work life, home life, and regular routine, including their recreational behaviors. Lifestyle activities include visits to and time spent at a consumer's residence and place of employment; travel patterns and habits, including commuting patterns and air travel; and visits to outdoor recreation destinations, nightlife locations, sports and entertainment venues, museums, amusement parks, tourist destinations, or other recreational destinations.

Identity characteristics may include demographic and socioeconomic attributes of a consumer. Demographic and socioeconomic attributes of a consumer may include where a consumer lives, information about a consumer's family, where a consumer works, and what a consumer does for work.

Preference characteristics may include information on preferences of a consumer regarding commercial activities and/or lifestyle-relevant activities in which the consumer engages or desires to engage. Preference characteristics regarding commercial activities of a consumer may include preferences of the consumer for particular types of products or services or particular products or services. Brand loyalties of a consumer may be included in preference characteristics for the consumer.

For characteristics that a consumer analytics system is configured to infer or predict based on location data, the consumer analytics system may also infer or predict a strength of the characteristic or a likelihood that the characteristic has been correctly inferred/predicted.

Any characteristic of a consumer or group of consumers that is inferred/predicted by the consumer analytics system for the individual consumer or for a group of consumers in which the consumer is included may be a condition of an action or may be evaluated to determine whether one or more conditions have been satisfied. In examples described below, characteristics of a consumer that may trigger a consumer analytics system to take an action include behavior characteristics that relate to commercial activity, including that relate to a commercial activity in which the consumer is engaging at the time the behavior characteristics are identified. In some embodiments, identity and/or preference characteristics may additionally or alternatively satisfy conditions that, when met, trigger the system to take an action. Further, while examples of behavior characteristics that may trigger an action are described herein, it should be appreciated that characteristics of a consumer related to any suitable behaviors may be used as conditions of an action or evaluated to determine whether one or more conditions have been met. Examples of behaviors that, in embodiments, could trigger a consumer analytics system to take actions when the system infers/predicts characteristics of a consumer related to the behavior include (but are not limited to):

Outdoor recreational (hiking, biking, swimming, sailing, beach, etc.);
Viewing or playing sports (baseball, football, golf . . . );
Watching a movie in a movie theatre;
Visiting a known location (like one's place-of-work or home);
Going inside a retail store, restaurant, convention center, or other point of interest;
Driving past a retail, store, restaurant, convention center, or other point of interest;
Traveling on a path that includes visits to particular stores, such as a first store or store of a first type (e.g., a grocery store) and a second store or store of a second type (e.g., a department store that includes a grocery department);
Deviating from a behavioral pattern, such as by visiting a setting or type of setting the consumer does not typically visit;
Traveling toward a setting;
Making a purchase at a setting;
Moving in a trip that includes a visit to one setting or type of setting and does not a visit to another setting or another type of setting;
Driving past a billboard or other "Out of Home" (OOH) advertisement;
Taking a trip by air, rail, car, bus, or boat; and
Any combination of the foregoing.

As consumer characteristics are predicted and/or inferred by a consumer analytics system of a consumer analytics system, the consumer analytics system may take one or more actions when conditions for taking the actions are satisfied by the characteristics. Any suitable action may be taken. In some embodiments, information collection actions may be triggered by consumer characteristics meeting conditions for the actions. In some embodiments, information storage actions may be triggered by consumer characteristics meeting conditions for the actions.

An information collection action that may be taken by a consumer analytics system may include collecting any suitable information from any suitable source. In some cases, a consumer analytics system may collect information from a consumer by soliciting information from the consumers. Information may be solicited in any way, including by sending messages to a consumer requesting that the consumer perform a task. In other cases, a consumer analytics system may collect information from a data source external to the consumer analytics system. information that may be collected by a consumer analytics system may include any suitable information, including information related to one or more commercial entities, products, and/or services. In some embodiments, a consumer analytics system may collect information relating to commercial activity. Information regarding commercial activity may relate to commercial activity of a consumer and/or of a commercial entity. Information regarding a commercial activity may relate to a consumer, a commercial entity, and/or interactions between a consumer and a commercial entity. The information that is collected may be information that the consumer analytics system may evaluate to determine characteristics of a consumer and/or characteristics of a group of consumers related to commercial activity, such as behavior, identity, or preference characteristics of a consumer or behavior, identity, or preference characteristics shared by consumers of a group of consumers.

Rewards Types & Granting of Rewards

Figure 5:
FIG. 5 is an exemplary image of an interface for a consumer to see which surveys have been triggered and available for her to complete.
Figure 6:
FIG. 6 is an exemplary image of one screen of an interface for a consumer to complete a survey.

In some embodiments, the consumer analytics system may incent consumers to opt-in to sharing electronically-captured location data with the consumer analytics system and/or to perform a task (e.g., provide information as part of a task, such as by completing a survey) requested by such a system as a result of location-triggered actions, in return for rewards. Such rewards may include, but are not limited to, food or beverage coupons or vouchers, merchandise discounts, discounts on their purchases (e.g., 15% off), entries into prize drawings, material goods, or cash. As illustrated in FIG. 5, for example, the consumer analytics system may render an interface, which may be displayed to a consumer via a mobile device, by which a consumer may view tasks the system 108 desires the consumer to perform (e.g., answering survey questions) and rewards that are offered to the consumer for performing the tasks. FIG. 6 illustrates an example of another interface that may be displayed to a consumer via a mobile device by which a consumer may perform a task that includes answering survey questions.

In some embodiments, consumers may be incentivized to complete a location-triggered task by being offered a reward that they will receive upon completion of a task. In some embodiments, the consumer analytics system may inform consumers in advance of performing the task of a specific reward the consumers will receive. In other embodiments, consumers will not be informed of their reward until after they have completed the task. In still other embodiments, the system may determine dynamically whether or not to inform a consumer of the reward in advance, and this element of variability may be used, in part, to maintain an element of surprise so as to increase consumer engagement.

In some embodiments, consumers may earn rewards through the accrual of reward points. Accordingly, in some embodiments, the consumer analytics system may maintain accounts or other information relating to consumers in which information about rewards is stored and updated. In some such embodiments, the consumer analytics system may grant rewards points based on any suitable factors, such as in proportion to the number of days of location data-sharing by the consumer, the number of location-triggered tasks completed by the consumer, and/or any other metric by which a consumer's performance of tasks may be measured. Some other metrics that may be used may relate to the manner in which consumers perform tasks. For example, the brevity of the turnaround time with which a consumer fills out a location-triggered survey, obtains media (e.g., a photograph), or otherwise completes a task, or the quality of their open-response survey response text, the quality of their media, or the quality of any other response requested by a task, or any other standard by which the quality of a survey response or response requested by a task, may be used by the system to determine a reward (including a type of reward and/or a value of a reward) to offer.

In some embodiments, the reward that the consumer analytics system may offer to a consumer may be an instant reward or may be a conditional reward.

An instant reward may be one that provides a value to the consumer when the consumer is offered the reward. An instant reward may not have a condition attached to the reward and/or may not require that the consumer perform any other task or take any other action (e.g., engage in any other behavior) to earn the value of the reward. Instant rewards may be granted following completion of specific location-triggered tasks by the consumer, or may be granted randomly or pseudo-randomly following the completion of such tasks. In some embodiments, at least some instant rewards may be of high value, which may increase consumer engagement by encouraging customers to desire rewards. In some such embodiments, high-value rewards may be given out with a lower frequency than lower value rewards. This may provide consumers with a game or lottery element for the rewards, where the consumers have a chance of obtaining a high-value reward, but where there may be a low probability of any particular consumer receiving the high-value reward in response to the consumer performing any particular task.

A conditional reward may be a reward for which a consumer may only redeem the value once the consumer has met one or more conditions, such as by performing some other task or engaging in some behavior. In some embodiments, the identity of a conditional reward may be hidden from the consumers until the one or more conditions are met, while in other embodiments the consumer may be notified of the reward and the conditions that are to be fulfilled for the value of the reward to be made available to the consumer. Any suitable set of conditions may be associated with a reward, as embodiments are not limited in this respect. A condition may be based on information that may be detected from a consumer's location, such as based on characteristics of a consumer (including behaviors of the consumer) that may be determined from the consumer's location. For example, the value of a food coupon to a particular restaurant may only be made available to the consumer if the consumer is within X miles of the restaurant at a particular time of day and/or day of week.

The system may also be programmed to select the rewards that may be offered to a consumer for completion of a task based upon any suitable factors, including any number of consumer location characteristics. For example:

A reward may be granted following the Nth visit to a particular retail/restaurant location or chain, or the Nth survey response for surveys that relate to a particular retail/restaurant location or chain A reward may be granted after the consumer drives by a competitor before filling out a location-triggered survey at a specific retailer A reward may be granted after a consumer fills out a location-triggered survey at a location which they do not typically visit as part of their normal routine In some embodiments, the system may additionally or alternatively customize a size of a reward's value to a particular consumer or for a particular task to provide larger incentives for the consumer or consumers to complete a specific task of interest. In some cases, a task that a consumer may be prompted to perform may be uncommon, and in these cases the value of collecting consumer information when these tasks are performed is great, so rewards for these tasks may have a higher value than other rewards. Consumers may thus be incentivized with larger rewards to maximize the rate of information collection from these tasks. As another example, a behavior of interest that may trigger the system to request a consumer to perform a task (e.g., complete a survey) may be rare, and the value of information that may be provided by a consumer engaging in the behavior may therefore be great. For example, a consumer may first visit Retailer 1 and subsequently drive directly to Retailer 2, a competitor. Because that consumer may be able to provide valuable information regarding consumers who are customers of both retailers, or about something lacking about Retailer 1 or something offered by Retailer 2 that led the consumer to visit both retailers, the consumer may be requested to complete a location-triggered survey and may be incentivized, with a larger reward, to do so.

Reward Selection

Rewards may be offered to consumers in any suitable manner. In some embodiments, by completing tasks, the consumer may earn reward points that the consumer may redeem for rewards. In other embodiments, a particular reward may be offered to a consumer in exchange for completing a task. In other embodiments, a consumer may be presented with a list of one, two, or more rewards from which the consumer may select the reward with which the consumer will be presented. In some embodiments in which consumers earn reward points, the consumer may be presented with such a list that includes point values assigned to each reward, and the consumer may be able to select any reward that points has a worth in rewards of equal or lesser point value than a total rewards points accrued by the consumer and/or offered to incent performance of the specific task.

In some embodiments, the consumer analytics system may customize a particular reward offered to a consumer, a list of particular rewards and/or a point value of each reward, and/or a number of reward points provided to a consumer for the consumer based on the specific location behaviors of the consumer. For example, in some embodiments, consumer location/visit history may be used by the system to determine a set of retailers and restaurants that have been visited by the consumer, and the system may limit the list of rewards to offer the consumer to rewards redeemable at these retailers and restaurants. As another example, a list of available rewards may be limited to include those redeemable at establishments on known travel routes for a consumer, such as a specific café on the consumer's known commute route or another travel path.

In some embodiments, the system may determine reward types based at least in part on specific information received from a consumer when the consumer performs a task (e.g., specific responses within a survey) or on other information collected from or about the consumer. For example, a consumer might be given a reward that best reflects the consumer's self-reported preferences. Such preference information may be received from a consumer in any suitable form. For example, the information may be collected from a consumer by the system in response to a question by the system regarding the consumer's preferences for rewards. As another example, the system may determine the preference from information provided by a consumer as part of performing a task, such as where a consumer expresses in a survey response a preference for healthful food options. As an example of such reward-tailoring, in the case of a consumer who prefers healthful food options, the system may identify that the consumer is to be presented with a reward that is a coupon for carrot sticks rather than a coupon for a soda at a quick service restaurant. As another example, a consumer might express a preference for salads rather than sandwiches at a particular restaurant chain, and might receive therefore receive tailored rewards for salads at that particular restaurant chain.

In some embodiments, rewards and/or types of rewards offered to a consumer (including particular rewards or rewards included in a list of options) may additionally or alternatively be customized by the system for a consumer based on known consumer demographic information. Consumer demographic information that may be used by the system may potentially include, but is not limited to, age, gender, number and age of children, household income, and/or whether the consumer has pets at home.

In some embodiments, the system may additionally or alternatively select rewards, types of rewards, values of rewards and/or other parameters of rewards to fulfill a goal of influencing a consumer to visit a particular business, business chain, or individual location of a business chain. For example, when the consumer analytics system requests that a consumer complete a survey in response to detecting that the consumer has visited a STARBUCKS® or is a regular customer of STARBUCKS®, the system may present a reward to determine whether the consumer can be encouraged to visit a DUNKIN DONUTS®. For example, the reward may be a coupon for a free coffee at DUNKIN DONUTS®, regardless of whether the consumer has previously visited a DUNKIN DONUTS®, or the reward may be a coupon redeemable at a specific DUNKIN DONUTS® location known to be on the consumer's commute route.

The system may additionally or alternatively select a value or other parameters of the reward to test the strength of customer affinity to a business or willingness to visit a new business. For example, rewards of different values may be presented to different consumers to determine a value that will influence consumers to visit a business the consumer does not routinely visit or has not previously visited. For example, consumers who the system detects to be dedicated customers of STARBUCKS® may be offered rewards for DUNKIN DONUTS® of differing value (e.g., coupons with varying discounts, or coupons offering free items for different lengths of time) to determine how much of a reward will drive a regular STARBUCKS® customer to visit a DUNKIN DONUTS®. The reward value may additionally or alternatively be selected based on a detected strength of characteristics of a consumer. For example, a consumer who visits a STARBUCKS® often may be offered a DUNKIN DONUTS® coupon of a greater value than a consumer who visits a STARBUCKS® only occasionally.

Reward Availability and Redemption

Figure 7:
FIG. 7 is an exemplary image of an interface for allowing a consumer to view which rewards she has earned from her participation.

In some embodiments, a consumer analytics system that offers rewards may maintain information about consumers, which may implement a "rewards wallet" that includes a list of the rewards that the system has offered to the consumer but that the consumers have not yet redeemed. FIG. 7 illustrates an example of an interface, which may be displayed to a consumer via a mobile device, by which the system may display a rewards wallet to a consumer. The rewards in the rewards wallet may include any suitable type of reward, including instant rewards that the consumers have earned the value of, conditional rewards that the consumers have earned the value of, and/or conditional rewards that the consumer has not yet earned the value of. Thus, at any specific moment, any of the rewards in a consumer's rewards wallet may be immediately available for redemption or may be unavailable, based on a variety of conditions, including rules, and/or qualifiers such as those outlined below. In some embodiments, rewards not available for immediate redemption (due, for example, to unfulfilled conditions) may be identified as such in the rewards wallet. The unavailable rewards may be identified through being displayed differently, such as by being grayed out and/or being displayed together with a message explaining why the reward is not currently available. A message explaining why the reward is not available may, for example, list unfulfilled conditions for the reward. Such a display may be generated based on data about the consumer and/or terms of rewards that may be stored in any suitable way.

As mentioned above, a reward may be associated with any suitable conditions that govern the availability of the reward for redemption by a consumer, after the consumer has been offered the reward in response to the consumer taking a task. In some cases, the availability of a reward for redemption may be determined by location behaviors of a consumer and/or any other suitable inputs. Reward availability may be tied, for example, to:

The current time of day, or a specific time of day/day of week. For example, a sandwich coupon may be available only during the weekday lunch period.

The area around the consumer's current location, or other defined region, for example their home or work locations.

A combination of these or other location-gated and time-gated metrics

In some embodiments that operate with conditional rewards, the system may provide a notification, for example via a message displayed in a user interface of the consumer analytics system, a text message (such as a message in SMS format), email, or other form of communication, to a consumer regarding the upcoming availability of a reward. For example, the consumer analytics system may provide a consumer with a message that "tomorrow at noon a lunch food reward will be available" or "a food reward is now available for a restaurant within one mile of your current location." Such a message may be presented to a consumer in cases in which the system has not yet revealed the nature of the reward to the consumer and cases in which the system has revealed the nature of the reward. In some embodiments, the system may conceal the nature of such a reward from a consumer, including in cases in which the reward is included in the consumer's rewards wallet. For example, a consumer may not be informed of a reward's value until the reward is available. As another example, in some embodiments, the system may not inform a consumer of the identity of the redemption location for a reward until the consumer is within very close proximity of the location. The system, based on analyzing the consumer's location, may in some such embodiments lead the consumer to the location at which the reward may be redeemed by presenting the consumer with directions on a map, with a specific compass direction or with a set of instructions. In other embodiments, however, the system may provide a consumer with a message that identifies the reward as well as the circumstances under which the reward will be available soon.

In some embodiments, the system may display a list of redemption locations for available rewards graphically on a map, so that the consumer can easily identify the nearby locations at which available rewards may be used.

Rewards Redemption Verification and Fraud Prevention

In some embodiments, each time a consumer redeems a reward, the consumer analytics system may record into storage the details of the redemption. The record of the redemption may include any suitable information, as embodiments are not limited in this respect. For example, the record may include information such as:

- Where—latitude, longitude as well as the name and/or other identifier of the store
- When—a timestamp of when the reward was redeemed
- Device details—If a consumer's device is used to redeem the reward (e.g., via a rewards application and/or consumer analytics application executing on a smart phone), the type of phone running the application, as well as which operating system version, etc.
- Point-of-Sale information—Any suitable details from the point of sale system, such as the items purchased, the ID of the employee servicing the consumer, etc.

In some embodiments, when this data is recorded, the data may be compared with the store's computing systems to verify that the store's systems show that a similar transaction has taken place. This verification can be done either at the time of the transaction or at a later date/time. The latter case may be easier for stores whose systems make real time access difficult.

In some embodiments, the consumer analytics system may periodically or occasionally process records of rewards redemption to identify any potential fraud, such as by searching for patterns that indicate fraud. Potential fraud may be identified based on data indicating unlikely events, such as:

- A consumer redeeming rewards far away from where location data for the consumer indicates the consumer was at the time.
- A consumer redeeming a significant and/or large number of rewards within a small time period.

Potential fraud may also be identified based on probabilistic indications of fraud, such as by identifying:

- One employee who has significantly higher rates of rewards redemption than other employees at a given store.
- One store location that has significantly higher rates of rewards redemption than comparable stores.
- One specific make, model, and OS version of phone that has significantly higher numbers of rewards than its market share would predict it should.
- Any combination of similar metrics When potential fraud is identified, the system may issue an alert to the business at which the reward is redeemable (e.g., by issuing an alert to a central office for a chain or to a particular location of a chain) to notify the business of the potential fraud and enable investigation. The alert may include any suitable information, as embodiments are not limited in this respect. For example, a report of the suspicious activity and related information (store locations involved, log of redemptions, etc.) may be generated automatically by the consumer analytics system and sent to the store as part of the alert.

Rewards Redemption Analytics

In some embodiments, each time a reward is redeemed by a consumer, in addition to or as an alternative to the information described above for verification and fraud detection, the system may record into storage details of the redemption that may be useful for consumer analytics and business intelligence. The details regarding the redemption may include any suitable information. For example, the details may include information such as:

- Demographic information and/or other details regarding the consumer
- Amount spent at the business on the visit in which the reward is redeemed at the business
- Items purchased in that visit
- Location analytics of that visit, including stores and other POIs driven past, at which personally-relevant location (home, work, etc.) the consumer's trip began, etc.

The consumer analytics system may compute any suitable consumer analytics based on this stored information. The consumer analytics system may then present the information to any suitable party, such as one or more businesses at which the reward was redeemable. The system may compute and present, for example, information that allows a retailer/restaurant (or any other category of POI at which a reward is redeemable) to understand how effective each reward is at encouraging consumers to visit a business. Such information may include:

- Average and median times between reward earned and reward redeemed by a consumer
- Average and median amount of money and/or time spent at the business on visits in which the reward is redeemed
- Average and median different amount of money and/or time spent by a consumer at the business in the N days after the reward is earned.

Additionally or alternatively, the consumer analytics system may determine a baseline average amount of time and/or money spent at a business, collected via surveys or any other source, and use this baseline to compute the additional revenue earned by the business that may be attributed to the reward. The system may then provide the number identifying the additional revenue earned by the business to the business as a specific measure of the reward's success.

One method the consumer analytics system may use, in some embodiments, to compute a baseline average amount of money and/or time spent is to compare the amount of time and/or money consumers who redeemed rewards had spent at the given POI in the period before the reward was earned. The consumer analytics system may then compare the amount spent by the consumers before the reward was earned to the amount spent after the reward was earned.

Another method that the consumer analytics system may use is, for the time period in which the rewards were redeemed, comparing one or more characteristics of consumers who redeemed a reward with those who earned the reward and did not redeem the reward. Any identified trends in differences in characteristics between consumers who redeemed a reward and those who did not may also be used as a measure of the additional revenue accounted for by the reward being given.

In addition, in some embodiments, the system may calculate a total gross profit on the consumers' visits. The system may, in some such embodiments, compute this total gross profit by subtracting the cost of the products purchased in each consumer's visit from the amount of money spent by consumer in each visit. The system may then use the total gross profit to compute a specific Return On Investment (ROI) for the reward, such as by comparing the cost of the reward with the total gross profit. The system may then provide the ROI to a business at which the reward was redeemable to provide the business with a measure of the effective profit the rewards program.

Comparing Rewards

In embodiments in which the system calculates an ROI of the type described above, the measure of ROI may be computed individually for each type of reward given out. The ROI on each reward may then be compared with the ROI of one or more other rewards, such as multiple rewards offered by the same business, to determine which reward provides the best ROI.

Determining which reward provides the best ROI may provide an indication of which reward the system should offer more often in the future or otherwise expand on.

Figure 8:
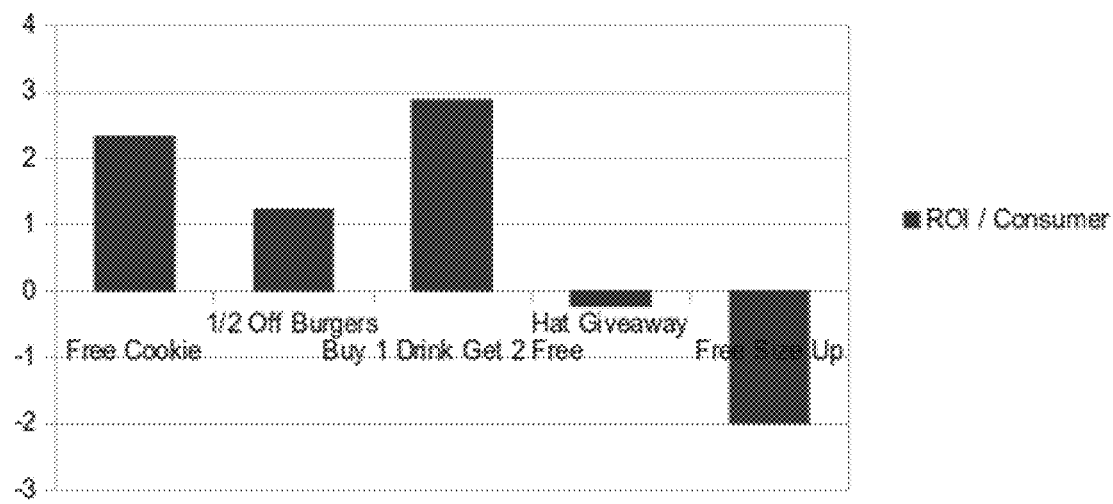
FIG. 8 is an example analytic chart of showing average Return On Investment (in dollars) for four different reward types.

In some embodiments, ROIs may also be used as a basis for the system, an administrator of the system, or a business at which the reward is redeemable to change the details of a reward. These changes may be made by manual input or, in some embodiments, may be performed automatically by the system based on criteria programmed into the system. For example, if one reward happens to have a significantly lower ROI than others, a cost of the reward may be lowered by changing the reward to offer a lower discount or to be limited to products for which the business has a higher margin. FIG. 8 is an example analytic chart of showing average Return On Investment (in dollars) for four different reward types. As shown in FIG. 8, the "Hat Giveaway" and "Free Size Up" rewards have a negative ROI and are costing the business each time these rewards are redeemed. Therefore, when the ROI for these rewards programs is evaluated, this may trigger the system and/or a person associated with the consumer analytics system and/or a business at which the reward may be redeemed to change the reward.

Avoiding Skew

In some embodiments, the consumer analytics system may also determine how much, if any, skew is being introduced into the data collected from consumers as a result of rewards influencing the behavior of the consumers. While businesses may be interested in how much a reward can or does influence consumer behavior, if a consumer's behavior is influenced too much by a particular reward or by multiple rewards offered to a consumer, information regarding the consumer's behavior may not be valuable to the business. For example, if a consumer's travel routes are influenced too much by rewards, information regarding that consumer's travel routes may not be valuable to businesses. In some embodiments in which the consumer analytics system computes or estimates skew introduced by rewards, the system may identify, for a set of consumers related in some way (e.g., consumers who are all customers of a business, or who share a demographic characteristic), characteristics (e.g., behaviors) of consumers who have been offered rewards and characteristics of consumers who have not been offered rewards. The system may then compare those characteristics to identify any differences between the consumers of the set that may be indicative of skew. Additionally or alternatively, in some embodiments that compute or estimate skew, the system may compare characteristics determined for a consumer before and after one or more rewards were offered to determine whether the characteristics differ greatly, which may be indicative of potential skew.

Linking Other Data

In some embodiments, each reward a consumer may earn may be linked by the consumer analytics system to the consumer's loyalty cards, credit or debit card transaction log data, social media data, and any other data source for the consumer.

By connecting these data sources onto the rewards, the consumer analytics system may compute additional metrics and analytics for the consumer. For example, the system may be able to obtain information about the consumer from these sources rather than others (e.g., surveys) to provide information on how much and what the consumer bought on each visit.

Published to Social Media

As part of establishing a consumer account with the consumer analytics system, the consumer analytics system may prompt a consumer to identify social media services, such as FACEBOOK®, TWITTER®, and FOURSQUARE®, that the consumer uses. If the consumer identifies social media services, and provides permission to do so, the system may publish to these services information about the rewards redeemed by the consumer. For example, the system may publish information regarding rewards to the consumer's social media feed at various stages, such as by publishing a post to a FACEBOOK® account each time the consumer earns a reward, telling the consumer's friends about the reward.

Survey Market System

The system described above may, in some embodiments, provide incentives to consumers in exchange for participating in market research. Retailers, restaurants, and other businesses or organizations that may be points of interest in the consumer analytics system can use analytics produced by the system and therefore may pay for access to the system and/or the analytics. In this way, the system may function in some embodiments as a two sided market: the consumers on one side, providing information or access to information in exchange for rewards, and the businesses on the other, acting as the customer of the system to purchase information on consumers.

One method for creating a business around this system is to charge businesses for the ability to field survey questions and for access to survey response and location analytics data. The fee could be a set amount per survey, per survey response, or per store, or in any other manner.

Another approach may be more effective in some environments because, to keep the market functioning well in these environments, the number of requests for survey responses may have to be kept in balance. If there are too few tasks and rewards, consumers who participate in the system may get frustrated and stop performing tasks in exchange for rewards. If there are too many tasks and rewards, either consumers may be feel they are being excessively bothered, or consumers may complete only some tasks such that some businesses will not receive as many responses as may be needed to make informed decisions based on information generated from the responses. Thus, in some embodiments that may be used in these environments, stores are charged a fee and the system operator will use part of the fee to cover the costs of the rewards for consumers. In other embodiments, stores will provide (or defray the cost of) rewards for their own stores. As described elsewhere, in many cases, properly targeted and optimized rewards will actually have a positive return on investment as the reward may bring the consumer back into the store. To maintain a balance in the system, in these embodiments, the businesses can be charged dynamic prices based on a few different factors including:

Which POIs are involved

How quickly responses are needed

Which kinds of consumers responses are needed from

In some embodiments, to facilitate such dynamic pricing, the system may include an interface through which electronic information may be provided by businesses to indicate what prices they are willing to pay for a request to perform a task, in a particular context, to be delivered to a consumer. This information may be provided through the interface dynamically, as the system detects opportunities to request a task of a consumer, or may be provided in terms of criteria or an algorithm that may be evaluated by the system to determine a price to request a task in a particular context. Regardless of how this information is provided, the system may be programmed to detect opportunities to request tasks and evaluate information received from one or more businesses to determine which task is requested in a particular context.

The system can balance the requests for survey responses or other tasks with the predicted number of consumers visited various stores and determine a price for each survey response request. As the predicted likelihood of a deficit in survey responses increases, the system may increase the price for those kinds of responses. Likewise, if the number of rewards which are being supported by stores dwindles, the system may encourage businesses to add more by reducing the price for participation by the businesses.

Additionally or alternatively, as multiple different stores use the system, there may naturally be competition for survey responses. A business interested in data on its competitors may want to gather analytics regarding its competitors. In some such cases, one of the competitors may also be a customer of the system and also want these analytics. In some embodiments, therefore, businesses may be given the ability to block competitors from obtaining information generated by consumers regarding the business. The system may enable businesses to block access by charging a fee for the business to block access by other businesses in a specified market area or by other specified businesses. In other embodiments, the system may administer an auction in which businesses are allowed to buy all of the analytics generated based on information regarding any subset of POIs, such as all businesses in a certain market area. In some such other embodiments, a business may thus be able to purchase all of the analytics generated based on information regarding its own stores and regarding its competitors, which would prevent competitors from learning about consumer behavior across the whole market area. For example, a burger restaurant may be able to purchase in such an auction exclusive access to data from all hamburger restaurants for which the system collects information from consumers and/or generates information, which would prevent all other hamburger restaurants (including the hamburger restaurant's competitors) from obtaining this information. In embodiments in which the system operates an auction, a set of information (e.g., survey responses) on which a business may bid may be segmentable in any suitable manner. For example, the system may segment, or the business may be able to segment, the information based on characteristics of the consumers, including by location behaviors exhibited by those consumers. For example, a business may be able to bid on (and receive exclusive access to) responses from consumers who had driven past a Tofu Tiles restaurant and then visited a Shortstack Pancake stand. As another example, a business may be able to bid on (and receive exclusive access to) all consumers who have a driving commute which goes past at least two hamburger restaurants.

In still other embodiments, the system may permit different businesses to purchase copies of the same survey responses or location analytics data collected and/or generated regarding the businesses. In some such embodiment, for example, two separate hamburger restaurant chains may be able to receive all of the information collected and/or generated by the system regarding any hamburger restaurants.

Survey Administration

In some embodiments, the consumer analytics system provides a user interface for businesses to enter and manage the survey questions the businesses would like to ask consumers. The interface may also enable businesses to specify how much the businesses are willing to pay for the survey responses and data generated by the consumer analytics system based on consumer locations and/or the survey responses. The system may also include an interface for configuring where, when, and to whom the survey should be provided, such as locations and demographic characteristics that should be detected for a consumer to be prompted to answer the questions.

Survey Metering

As discussed previously, in some embodiments, the system may function as a two-sided market. In some such embodiments, to maintain the balance and not overly burden consumers, the system may set prices dynamically. In addition or alternatively, the system may meter requests for tasks (e.g., completion of surveys) to consumers so as not to overburden the consumers. In some such embodiments, the system may have a rules engine that allows an administrator to control how many requests of which type are sent to which kinds of consumers.

A potential problem that may arise in this system in some environments is that the surveys themselves or the rewards can introduce skew into the results. Skew, as discussed above, may be undesirable. For example, simply asking a consumer in a survey if she enjoys the french fries from a restaurant, Tofu Tiles, may raise that consumer's awareness of the Tofu Tiles brand and the french fries from there, potentially making it more likely the consumer will visit a Tofu Tiles location in the future. In addition, by providing a consumer a reward for a free product redeemable at a given POI, the consumer may be more likely the visit the given POI.

In some embodiments, to help manage this skew, the rules engine of the system may meter which surveys and rewards go to which consumers.

Brand Tracking and Advertising Awareness

In some embodiments, the consumer analytics system may be used to measure the effectiveness of advertising and other types of marketing campaigns. To do so, tasks requested by the system may relate to the marketing campaigns, such as a task involving answering survey questions. For example, as part of a survey, questions may be asked to gauge:

How aware of a store's brand was the consumer

Which brands of store did the consumer consider for the visit

Which brand(s) are the consumer's favorite

By measuring the responses to these questions across multiple consumers, POIs, and times, the consumer analytics system may create measures of the overall awareness and sentiment among consumers for each brand.

For advertising campaigns involving physical signage (such as billboards, signs on buses, etc.), location analytics can be used to measure exposure by consumers to the advertising campaign. In some embodiments, for example, location analytics can be used to divide consumers into two sets: consumers who have been detected to be in the vicinity of an advertisement and can be inferred to have been exposed to the advertising and consumers who have not been detected to be in the vicinity of an advertisement and can be inferred not to have been exposed. The system, by comparing the brand awareness and number of visits to POIs for a given brand between the two groups, may measure how effective the advertisements of the campaign are at increasing brand awareness and driving foot traffic to locations. In other embodiments, locations of a group of consumers can be measured, and analytics generated, for a period of time that includes some periods in which the advertisements are active and some in which the advertisements are not active. By comparing brand awareness and visit numbers for the two periods for this set of consumers, the system may measure how effective the advertisements are at increasing brand awareness and driving foot traffic to locations.

What is claimed is:

1. At least one non-transitory computer-readable storage medium having encoded thereon executable instructions that, when executed by at least one computer, cause the at least one computer to carry out a method comprising:
    obtaining movement data of an electronic device carried by a consumer, the movement data tracking a movement path previously traversed at least once by the electronic device;
    receiving input provided by the consumer for one or more questions of a first survey;
    following receipt of the input provided by the consumer, selecting a first reward from a plurality of rewards that may be made available to the consumer for answering the one or more questions;
    storing information indicating that the first reward is available for redemption by the consumer as a previously-earned reward;
    following the storing,
        predicting whether the consumer is to be within a threshold distance of a location at which the previously-earned reward may be redeemed by the consumer, based on the movement data of the consumer and a current location of the consumer, and
        determining whether a first time, at which the consumer is predicted to be within the threshold distance of the location, matches or is within a threshold amount of time of a second time, the second time being a time at which the consumer may redeem the previously-earned reward at the location; and
    causing a notification to be issued to the consumer, via the electronic device, of a proximity of the consumer to the location, in response to a prediction that the consumer is to be within the threshold distance of the location at the first time that matches or is within a threshold amount of time of the second time, to alert the consumer about an opportunity nearby to redeem the previously-earned reward.

2. The at least one non-transitory computer-readable storage medium of claim 1, wherein the notification issued to the consumer is any one or any combination of a text message, an email message, and a message displayed on a the electronic device, regarding the previously-earned reward.

3. The at least one non-transitory computer-readable storage medium of claim 1, wherein the predicting of whether the consumer is to be within the threshold distance of the location comprises:
    utilizing at least one pattern of behavior of the consumer previously determined from an analysis of previously-collected location data for the consumer, a route that the consumer is currently travelling; and
    determining whether locations on the route are within the threshold distance of the location at which the previously-earned reward may be redeemed by the consumer.

4. The at least one non-transitory computer-readable storage medium of claim 1, wherein the determining of whether the first time matches or is within a threshold amount of time of the second time at which the consumer may redeem the reward at the location comprises determining whether the first time matches or is within the threshold amount of time of a time range during which the consumer is permitted to redeem the previously-earned reward.

5. The at least one non-transitory computer-readable storage medium of claim 1, wherein:
    the method further comprises determining the second time, wherein the determining of the second time comprises determining, based on location data for a plurality of consumers, a time range in which consumers of the plurality of consumers commonly visit the location; and
    the determining of whether the first time matches or is within a threshold amount of time of the second time at which the consumer may redeem the previously-earned reward at the location comprises determining whether the first time matches or is within the threshold amount of time of the time range.

6. The at least one non-transitory computer-readable storage medium of claim 1, wherein the predicting of whether the consumer is to be within the threshold distance of the location comprises predicting whether the consumer is to be within the threshold of distance of the location before a threshold time.

7. The at least one non-transitory computer-readable storage medium of claim 1, wherein the selecting of the first reward from a plurality of rewards that may be made available to the consumer for answering the one or more questions comprises:
    selecting the first reward, based on location data indicating locations of the consumer over time, to be a reward redeemable at a business that has been visited by the consumer.

8. The at least one non-transitory computer-readable storage medium of claim 1, wherein:
    the previously-earned reward is eligible to be redeemed at the location only at one or more times and not at other times;
    the second time is at least one of the one or more times; and the determining of whether the first time matches or is within a threshold amount of time of the second time comprises determining whether the first time matches or is within a threshold amount of time of the at least one of the one or more times.

9. A method for electronically communicating with one or more consumers to incentivize the one or more consumers to participate in an electronic data collection by providing answers to one or more surveys electronically distributed to the one or more consumers, the method comprising:
   receiving, by at least one processor from a mobile device operated by a first consumer, tracking data of the first consumer as the first consumer moves on a route, the tracking data comprising a plurality of units of location data each indicating a location of the first consumer and a corresponding time at that location;
   detecting, by the at least one processor, a behavior in which the first consumer engaged based, at least in part, on the tracking data of the first consumer, the plurality of locations including at least one location associated with a first business;
   in response to a detection that the behavior satisfies at least one condition for a first survey to be distributed to the first consumer, electronically transmitting at least one first message to the mobile device operated by the first consumer, the at least one first message soliciting the first consumer to answer one or more questions included in the first survey;
   receiving, by the at least one processor, at least one second message from the mobile device containing input provided by the first consumer for the one or more questions of the first survey; and
   following receipt of the at least one second message, selecting, by the at least one processor, at least two rewards from a plurality of rewards that may be offered to the first consumer, wherein the selecting of the at least two rewards comprises selecting a first reward to test a strength of an affinity of the first consume to a second business, the second business being selected based at least in part on the first consumer having visited the at least one location associated with the first business, the first reward being redeemable at a third business different from the first and second businesses;
   rewarding the first consumer by electronically transmitting at least one third message to the mobile device operated by the first consumer, the at least one third message including information regarding the at least two rewards, available to the first consumer as a result of completion of the first survey; and
   determining whether the first consumer redeemed the first reward at the third business.

10. The method of claim 9, further comprising:
    determining a number of times that the first consumer visited the first business,
    wherein the selecting of the at least two rewards comprises selecting a value of the first reward based, at least in part, on the number of times that the first consumer visited the first business.

11. The method of claim 9, wherein the selecting of the at least two rewards comprises selecting a value of the first reward based, at least in part, on values of rewards that were provided to a plurality of consumers of the first business and were subsequently redeemed by the plurality of consumers at the third business.

12. The method of claim 9, wherein the third business is a competitor of the second business.

13. The method of claim 9, wherein the selecting of the at least two rewards comprises selecting a second reward based, at least in part, on one or more characteristics of the first consumer determined by analyzing location data indicating locations of the first consumer over a period of time, the location data comprising the plurality of units of location data of the tracking data.

14. The method of claim 9, wherein:
    in the transmitting of the at least one third message, the at least one third message includes information regarding a plurality of reward options available to the first consumer, wherein each of the plurality of reward options is a reward to the first consumer for responding to the first survey; and
    the method further comprises receiving at least one fourth message from the mobile device operated by the first consumer, the at least one fourth message including information indicating a reward option that was selected by the first consumer from the plurality of reward options.

15. The method of claim 9, wherein:
    the second business is a same business as the first business; and
    the selecting of the first reward to test the strength of the affinity of the first consumer comprises selecting the first reward to test the strength of an affinity of the first consumer to the first business.

* * * * *